United States Patent
Lee et al.

(10) Patent No.: US 10,313,878 B2
(45) Date of Patent: Jun. 4, 2019

(54) ON-DEMAND NETWORK FUNCTION RE-AUTHENTICATION BASED ON KEY REFRESH

(71) Applicant: QUALCOMM Incorporated, San Diego, CA (US)

(72) Inventors: Soo Bum Lee, San Diego, CA (US); Adrian Edward Escott, Reading (GB); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/485,976

(22) Filed: Apr. 12, 2017

(65) Prior Publication Data

US 2018/0084413 A1 Mar. 22, 2018

Related U.S. Application Data

(60) Provisional application No. 62/395,901, filed on Sep. 16, 2016.

(51) Int. Cl.
  *H04L 9/08* (2006.01)
  *H04W 8/26* (2009.01)
  (Continued)

(52) U.S. Cl.
  CPC .......... *H04W 12/04* (2013.01); *H04L 9/0891* (2013.01); *H04L 63/0428* (2013.01);
  (Continued)

(58) Field of Classification Search
  CPC . H04L 9/0836; H04L 9/0822; H04L 2209/80; H04L 63/064; H04L 63/08;
  (Continued)

(56) References Cited

U.S. PATENT DOCUMENTS

2007/0074275 A1* 3/2007 Bajko ................... H04L 63/067
  726/4
2007/0206537 A1* 9/2007 Cam-Winget ........ H04L 63/162
  370/331

(Continued)

FOREIGN PATENT DOCUMENTS

GB        2356530 A       5/2001
WO   WO-2010025280 A2    3/2010

OTHER PUBLICATIONS

Alezabi K-A., et al., "An Efficient Authentication and Key Agreement Protocol for 4G (LTE) Networks," 2014 IEEE Region 10 Symposium, Apr. 16, 2014, pp. 502-507, Institute of Electrical and Electronics Engineers.

(Continued)

*Primary Examiner* — Dung Hong
(74) *Attorney, Agent, or Firm* — Holland & Hart LLP

(57) ABSTRACT

Methods, systems, and devices for wireless communication are described. A user equipment (UE) may determine that a security context with a network node has been established for more than a threshold time period. The UE may identify, based on a key hierarchy, a parent network node associated with the network node. The UE may transmit a key refresh request message to the parent network node to trigger a key refresh procedure between the parent network node and the network node. The UE may perform a procedure with the network node to establish a new security context based on the key refresh procedure.

30 Claims, 17 Drawing Sheets

(51) Int. Cl.
 *H04L 29/06* (2006.01)
 *H04W 12/04* (2009.01)
 *H04W 12/06* (2009.01)
 *H04W 12/10* (2009.01)
 *H04W 76/25* (2018.01)
 *H04W 60/04* (2009.01)

(52) U.S. Cl.
 CPC ............ *H04L 63/064* (2013.01); *H04L 63/08* (2013.01); *H04L 63/123* (2013.01); *H04W 8/26* (2013.01); *H04W 12/06* (2013.01); *H04W 12/10* (2013.01); *H04W 60/04* (2013.01); *H04W 76/25* (2018.02); *H04L 63/068* (2013.01); *H04L 2209/80* (2013.01)

(58) Field of Classification Search
 CPC ... H04L 63/20; H04L 9/3247; H04L 2209/24; H04W 12/04; H04W 12/06
 See application file for complete search history.

(56) References Cited

U.S. PATENT DOCUMENTS

| | | | | |
|---|---|---|---|---|
| 2008/0178269 A1* | 7/2008 | Kim | ...................... | H04W 12/06 726/4 |
| 2008/0310378 A1* | 12/2008 | Kitazoe | ................ | H04W 76/10 370/338 |
| 2010/0077469 A1* | 3/2010 | Furman | ................... | G06F 21/41 726/8 |
| 2011/0096737 A1* | 4/2011 | Venkatachalam | ........................... | H04W 36/0033 370/329 |
| 2011/0107087 A1* | 5/2011 | Lee | ....................... | H04L 9/0838 713/155 |
| 2013/0031255 A1* | 1/2013 | Maloy | ..................... | H04L 61/15 709/226 |
| 2013/0305386 A1* | 11/2013 | Zhang | ................... | H04L 63/205 726/27 |
| 2014/0053241 A1* | 2/2014 | Norrman | ................ | H04L 63/08 726/3 |
| 2014/0181904 A1* | 6/2014 | Craig | .................... | H04W 12/04 726/3 |
| 2015/0163202 A1* | 6/2015 | Nair | ...................... | H04L 9/0861 726/2 |
| 2016/0094542 A1 | 3/2016 | Lee et al. | | |
| 2016/0105283 A1* | 4/2016 | Mityagin | .............. | H04L 9/0891 380/279 |
| 2018/0317275 A1* | 11/2018 | Chang | ....................... | H04L 9/08 |

OTHER PUBLICATIONS

ISA/EP, International Search Report and Written Opinion of the International Searching Authority, Int'l Application No. PCT/US2017/047052, dated Nov. 30, 2017, European Patent Office, Rijswijk, NL, 17 pgs.

\* cited by examiner

ON-DEMAND NETWORK FUNCTION RE-AUTHENTICATION BASED ON KEY REFRESH

CROSS REFERENCES

The present Application for Patent claims priority to U.S. Provisional Patent Application No. 62/395,901 by LEE et al., entitled "On-Demand Network Function Re-Authentication Based on Key Refresh," filed Sep. 16, 2016, assigned to the assignee hereof.

BACKGROUND

The following relates generally to wireless communication, and more specifically to on-demand network function re-authentication based on key refresh.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communication system may include a number of base stations, each simultaneously supporting communication for multiple communication devices, which may be otherwise known as user equipments (UEs).

UEs may establish connections with a base station using authentication procedures. The authentication procedures may include establishing a security context for the UE and the associated network entities, e.g., an authentication and key agreement (AKA) protocol used to generate one or more security keys. The security keys may be used to secure and protect the air interface between the UE and the base station as well as backhaul traffic protection between various network entities. The security context may be created when the UE initially attaches to the core network via the base stations. The security context may then be stored at each network node associated with the connection, e.g., at the base station, at the mobility management entity (MME), at the home subscriber server (HSS), etc.

In some circumstances, the security context may be stored for an extended period of time. For example, UEs or other mobile devices (e.g., internet of thing (IoT) devices) may establish a connection and only send traffic infrequently. It is inefficient to use resources to establish a new security context each time such a device needs to send traffic. Additionally or alternatively, considerable battery power is used on the mobile devices to transmit and receive messages according to the AKA protocol. Further, maintaining the security context at the network nodes may raise a security concern. For example, a network node may be compromised due to a security key being leaked. The attacker could then use the leaked security key to impersonate the network node and therefore compromise communications with the UE.

SUMMARY

The described techniques relate to improved methods, systems, devices, or apparatuses that support on-demand network function re-authentication based on key refresh. For example, the described techniques provide for a user equipment (UE) to determine that a security context has been established for a threshold time period with a network node. The UE may identify a parent network node based on a key hierarchy and transmit a key refresh request message to the parent network node. The parent network node may be the parent node of the network node that the UE attempts to re-authenticate in the key hierarchy. The key refresh message may trigger a key refresh procedure between the parent network node and the network node. The parent network node may use the key refresh request message to identify the network node and obtain integrity verification information for the network node, e.g., perform a remote attestation procedure, receive integrity verification from a different network entity, etc. Based on the key refresh procedure, the UE and the network node may perform a procedure to establish a new security context. In some examples, the procedure may be a re-authentication procedure.

A method of wireless communication is described. The method may include determining, by a UE, that a security context with a network node has been established for more than a threshold time period, identifying, based at least in part on a key hierarchy, at least one parent network node associated with the network node, transmitting a key refresh request message from the UE to the identified parent network node to trigger a key refresh procedure between the identified parent network node and the network node, and performing a procedure with the network node to establish a new security context based at least in part on the key refresh procedure.

An apparatus for wireless communication is described. The apparatus may include means for determining, by a UE, that a security context with a network node has been established for more than a threshold time period, means for identifying, based at least in part on a key hierarchy, at least one parent network node associated with the network node, means for transmitting a key refresh request message from the UE to the identified parent network node to trigger a key refresh procedure between the identified parent network node and the network node, and means for performing a procedure with the network node to establish a new security context based at least in part on the key refresh procedure.

Another apparatus for wireless communication is described. The apparatus may include a processor, memory in electronic communication with the processor, and instructions stored in the memory. The instructions may be operable to cause the processor to determine that a security context with a network node has been established for more than a threshold time period, identify, based at least in part on a key hierarchy, at least one parent network node associated with the network node, transmit a key refresh request message to the identified parent network node to trigger a key refresh procedure between the identified parent network node and the network node, and perform a procedure with the network node to establish a new security context based at least in part on the key refresh procedure.

A non-transitory computer readable medium for wireless communication is described. The non-transitory computer-readable medium may include instructions operable to cause a processor to determine, by a UE, that a security context with a network node has been established for more than a threshold time period, identify, based at least in part on a key hierarchy, at least one parent network node associated with the network node, transmit a key refresh request message from the UE to the identified parent network node to trigger a key refresh procedure between the identified parent network node and the network node, and perform a procedure with the network node to establish a new security context based at least in part on the key refresh procedure.

In some examples of the method, apparatus, and non-transitory computer-readable medium described above, the parent network node comprises a control plane core network (CP-CN) function and the network node comprises an access node (AN).

In some examples of the method, apparatus, and non-transitory computer-readable medium described above, the key refresh request message comprises a network access stratum (NAS) message.

In some examples of the method, apparatus, and non-transitory computer-readable medium described above, the parent network node comprises a security anchor function and the network node comprises a CP-CN function.

In some examples of the method, apparatus, and non-transitory computer-readable medium described above, the security anchor function comprises a control plane authentication (CP-AU) function.

In some examples of the method, apparatus, and non-transitory computer-readable medium described above, the key refresh request message comprises an attach request message.

In some examples of the method, apparatus, and non-transitory computer-readable medium described above, the attach request message comprises an identifier associated with the UE.

In some examples of the method, apparatus, and non-transitory computer-readable medium described above, the key refresh request message comprises an authentication request message.

In some examples of the method, apparatus, and non-transitory computer-readable medium described above, the key refresh request message comprises an extensible authentication protocol (EAP) re-authentication message.

Some examples of the method, apparatus, and non-transitory computer-readable medium described above may further include processes, features, means, or instructions for using, for a predetermined time period after the key refresh procedure, the security context for user plane packet protection.

Some examples of the method, apparatus, and non-transitory computer-readable medium described above may further include processes, features, means, or instructions for performing at least one of encrypting the key refresh request message, integrity-protecting the key refresh request message, or combinations thereof.

A method of wireless communication is described. The method may include receiving, at a parent network node, a key refresh request message from a UE, identifying, based at least in part on the key refresh request message, a network node having a security context with the UE, obtaining an integrity verification information associated with identified network node, and identifying a procedure to be performed between the network node and the UE to establish a new security context.

An apparatus for wireless communication is described. The apparatus may include means for receiving, at a parent network node, a key refresh request message from a UE, means for identifying, based at least in part on the key refresh request message, a network node having a security context with the UE, means for obtaining an integrity verification information associated with identified network node, and means for identifying a procedure to be performed between the network node and the UE to establish a new security context.

Another apparatus for wireless communication is described. The apparatus may include a processor, memory in electronic communication with the processor, and instructions stored in the memory. The instructions may be operable to cause the processor to receive a key refresh request message from a UE, identify, based at least in part on the key refresh request message, a network node having a security context with the UE, obtain an integrity verification information associated with identified network node, and identify a procedure to be performed between the network node and the UE to establish a new security context.

A non-transitory computer readable medium for wireless communication is described. The non-transitory computer-readable medium may include instructions operable to cause a processor to receive, at a parent network node, a key refresh request message from a UE, identify, based at least in part on the key refresh request message, a network node having a security context with the UE, obtain an integrity verification information associated with identified network node, and identify a procedure to be performed between the network node and the UE to establish a new security context.

Some examples of the method, apparatus, and non-transitory computer-readable medium described above may further include processes, features, means, or instructions for obtaining the integrity verification information comprises performing an integrity verification procedure between the parent network node and the network node, or receiving the integrity verification information from another network entity, or combinations thereof.

In some examples of the method, apparatus, and non-transitory computer-readable medium described above, the integrity verification procedure may be performed according to a predetermined schedule, or based at least in part on receipt of the key refresh request message, or combinations thereof.

Some examples of the method, apparatus, and non-transitory computer-readable medium described above may further include processes, features, means, or instructions for determining that a predetermined number of key refresh request messages may have been received from the UE during a threshold time period. Some examples of the method, apparatus, and non-transitory computer-readable medium described above may further include processes, features, means, or instructions for refraining from initiating the procedure based at least in part on the determining.

In some examples of the method, apparatus, and non-transitory computer-readable medium described above, the integrity verification information may be based at least in part on a remote attestation procedure.

In some examples of the method, apparatus, and non-transitory computer-readable medium described above, the parent network node comprises a CP-CN function and the network node comprises an AN.

In some examples of the method, apparatus, and non-transitory computer-readable medium described above, the key refresh request message comprises a NAS message.

In some examples of the method, apparatus, and non-transitory computer-readable medium described above, the parent network node comprises a security anchor function and the network node comprises a CP-CN function.

In some examples of the method, apparatus, and non-transitory computer-readable medium described above, the security anchor function comprises a CP-AU function.

In some examples of the method, apparatus, and non-transitory computer-readable medium described above, the key refresh request message comprises an attach request message, the attach request message comprising a UE identifier and a key identifier received from the security anchor function during an initial attach procedure.

In some examples of the method, apparatus, and non-transitory computer-readable medium described above, the key identifier comprises an evolved key set identifier (eKSI).

In some examples of the method, apparatus, and non-transitory computer-readable medium described above, the attach request message comprises an identifier associated with the UE.

In some examples of the method, apparatus, and non-transitory computer-readable medium described above, the key refresh request message comprises an authentication request message.

Some examples of the method, apparatus, and non-transitory computer-readable medium described above may further include processes, features, means, or instructions for using, for a predetermined time period after a key refresh procedure, the security context for user plane packet protection.

Some examples of the method, apparatus, and non-transitory computer-readable medium described above may further include processes, features, means, or instructions for performing at least one of decrypting the key refresh request message, verifying the integrity of the key refresh request message, or combinations thereof.

DETAILED DESCRIPTION

Security concerns may be associated with one or more network nodes storing a security context associated with a user equipment (UE) for an extended time threshold. For example, an attacker may obtain a key used by the network node and the UE and then use the compromised key to impersonate the network node. Conventional techniques provide for the network, rather than a UE, to initiate a key refresh procedure between the UE and the network node. For example, the base station may trigger a key refresh procedure with the UE on-the-fly during an idle-to-connected mode transition, etc. Additionally, conventional techniques do not support a key refresh procedure between network functions (e.g., different network nodes) triggered (or initiated) by a UE. Instead, key refresh procedures may be performed indirectly, e.g., fresh attach for a mobility management entity (MME) key refresh, an S1 based handover for an access node key refresh, etc.

Aspects of the disclosure are initially described in the context of a wireless communication system. A UE may determine that a security context with a network node has been established for more than a threshold time period. The UE may use a key hierarchy to identify a parent network node of the network node and transmit a key refresh message to the parent network node. In some examples, the network node may include aspects of an access node and the parent network node may include aspects of a control plane core network (CP-CN) function. In some examples, the network node may include aspects of an CP-CN and the parent network node may include aspects of a security anchor function (e.g., a control plane authentication (CP-AU) function, a security gateway, etc.). As used herein, a "network node" may refer to any suitable node of a network for which keys are being refreshed. A "parent network node" may refer to any suitable node of a network that is a parent node of the network node or at a higher level in the hierarchy of the network node.

The key refresh message may trigger a key refresh procedure between the parent network node and the network node. The key refresh procedure may include the parent network node obtaining integrity verification information for the network node. The parent network node may identify a procedure to be performed between the network node and the UE to establish a new security context. In some examples, the procedure may be a re-authentication procedure performed between the network node and the UE to establish a new security context.

Aspects of the disclosure are further illustrated by and described with reference to apparatus diagrams, system diagrams, and flowcharts that relate to on-demand network function re-authentication based on key refresh.

Figure 1:
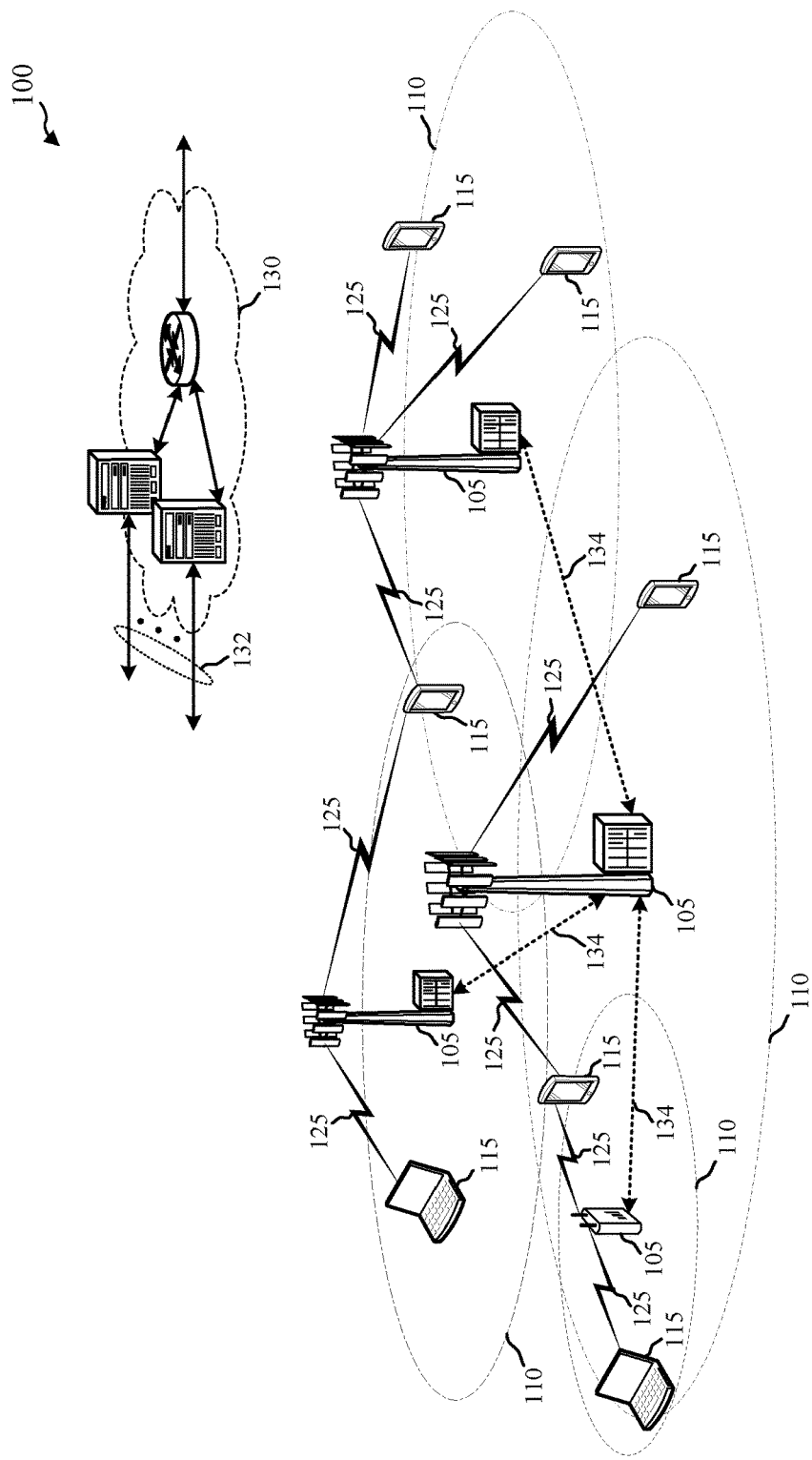
FIG. 1 illustrates an example of a system for wireless communication that supports on-demand network function re-authentication based on key refresh in accordance with aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a 5$^{th}$ Generation (5G)/New Radio (NR) or long term evolution (LTE) (or LTE-Advanced (LTE-A)) network.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. UEs 115 may be dispersed throughout the wireless communication system 100, and each UE 115 may be stationary or mobile.

A UE 115 may additionally or alternatively be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105. In some cases, base stations may be referred to as gNodeBs (gNBs).

Wireless communication system 100 may include a UE 115 connecting to a network of base stations 105, that may be referred to as an evolved universal terrestrial radio access network (E-UTRAN). Wireless communication system 100 may be an evolved packet core (EPC) network. The UE 115 may connect to the network (such as an internet protocol (IP) network) via connections to the base stations 105 and the core network 130. Core network 130 may include various network functions (or network nodes) such as a MME that may manage and store UE security contexts, control various authentication functions, select a serving gateway (S-GW) and a packet data gateway (P-GW). The S-GW may provide routing of information between the P-GW and the E-UTRAN (e.g., base stations 105), may carry user plane data, and anchor the UEs 115 for inter-base station 105 handoffs, etc. The P-GW may allocate IP addresses and route packets, interconnect with other networks, etc. The core network 130 may also include a home subscriber server (HSS) that may store subscriber identifiers and manage critical security information. Core network 130 may additionally or alternatively include one or more security gateways that secures backhaul traffic.

Wireless communication system 100 may support one or more aspects of the described techniques for on-demand network function re-authentication based on key refresh. For example, a UE 115 may determine that a security context between the UE 115 and a network node has been established for more than a threshold time interval. The UE 115 may identify a parent network node of the network node based on the key hierarchy. The UE 115 may transmit a key refresh request message to the parent network node to trigger a key refresh procedure between the parent network node and the network node. The UE 115 may then perform a procedure with the network node to establish a new security context. In some examples, the procedure may be a re-authentication procedure.

The parent network node may receive the key refresh request message and identify the network node. The parent network node may obtain integrity verification information for the network node either directly (e.g., using a remote attestation procedure) and/or indirectly (via receiving integrity verification information from a different network node). Once the parent network node has verified the integrity of the network node, the parent network node may identify the procedure between the network node and the UE. In some examples, the procedure may be a re-authentication procedure. In some aspects, the key refresh procedure may provide for provisioning of a new key to the network node. The integrity verification procedure may be a component of the key refresh procedure (e.g., when the integrity verification procedure is performed directly by the parent network node). In other aspects, the integrity verification procedure may be separate from the key refresh procedure (e.g., when the parent network node verifies the integrity of the network node based on information received from another network node). The re-authentication procedure may include, once the integrity of the network node has been verified and the new key has been provisioned for the network node triggering the re-authentication procedure, by the parent network node, between the UE 115 and the network node. Triggering the re-authentication procedure may include the parent network node sending a trigger message to the network node (which, in some examples, may additionally or alternatively be performed during the key provisioning procedure).

Figure 2:
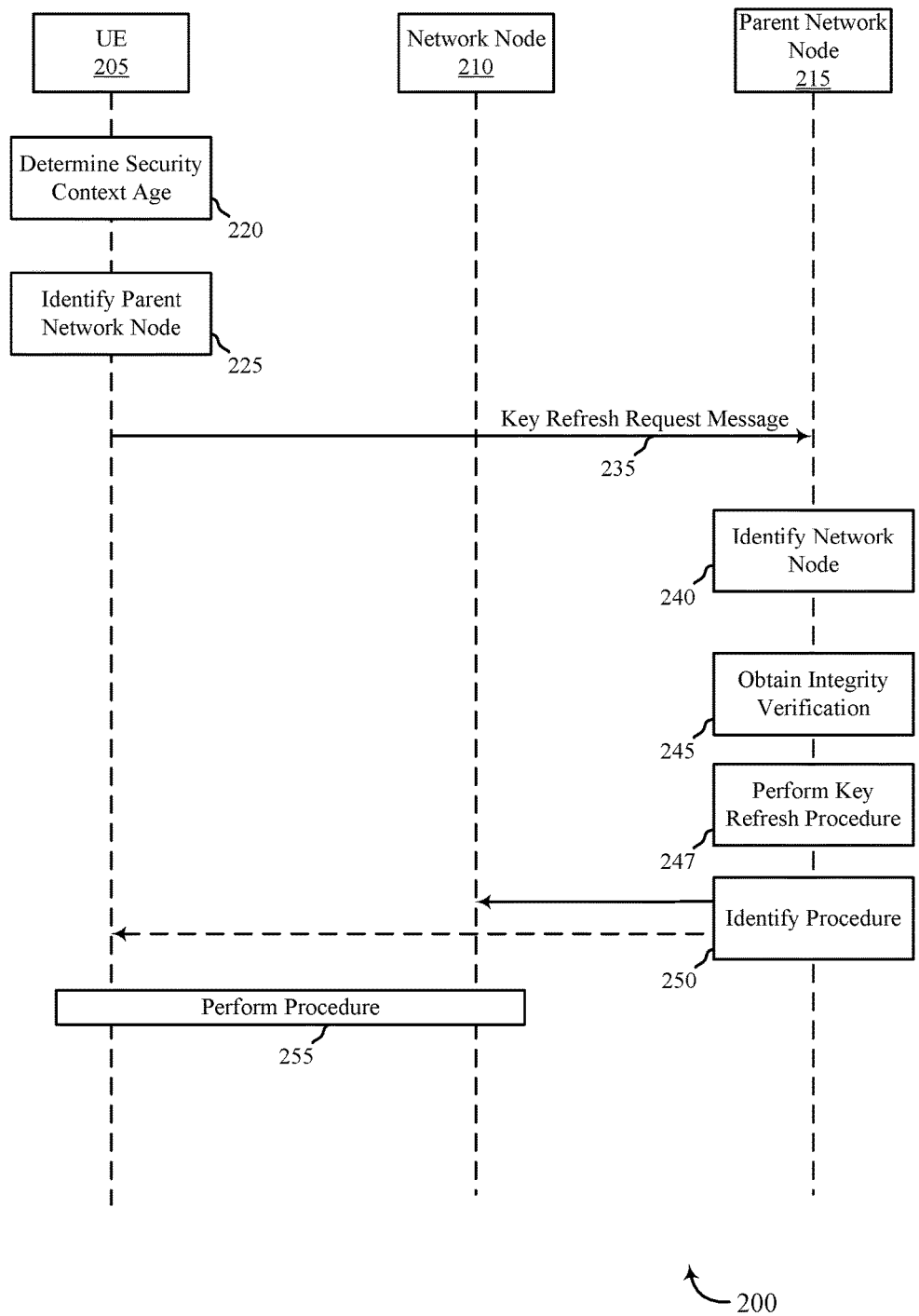
FIG. 2 illustrates an example of a process flow that supports on-demand network function re-authentication based on key refresh in accordance with aspects of the present disclosure.

FIG. 2 illustrates an example of a process flow 200 for on-demand network function re-authentication based on key refresh. Process flow 200 may implement one or more aspects of wireless communication system 100 of FIG. 1. Process flow 200 may include a UE 205, a network node 210, and a parent network node 215, which may be examples of the corresponding devices described above.

For example, UE 205 may have previously established a network connection to an E-UTRAN and core network. The E-UTRAN may refer, in some examples, to an access node such as a base station, a millimeter wave (mmW) base station, a cell, etc. The core network may refer to an EPC network and may include such nodes and/or functions as MME, S-GW, P-GW, HSS, etc. In some examples, the network node 210 may include aspects of an access node and the parent network node 215 may include aspects of a CP-CN function. In some examples, the network node 210 may include aspects of an CP-CN and the parent network node 215 may include aspects of a security anchor function (e.g., a CP-AU function, a security gateway, etc.).

At 220, UE 205 may determine the age of a security context. The security context may include a key established between the UE 205 and the network node 210, e.g., a CP-AU key, a CP-CN key, an UE 205/access node key, etc. The security context may have been established when UE 205 first established a network connection with the network, which can include one or more aspects of network node 210 and parent network node 215. Thus, dependent upon when the initial connection was made, the security context may have been established for more than a threshold time period, e.g., more than one hour, more than a day, more than a week, more than a month, etc. Persons skilled in the art will appreciate that this threshold time period may be set based on any number of suitable factor(s) such as, for example, the device type of UE device 205. Based on the security context having been established more than the threshold time, UE 205 may determine that a key refresh procedure is warranted.

At 225, UE 205 may identify a parent network node (e.g., parent network node 215) for network node 210. Upon identifying the parent network node, UE 205 may generate a key hierarchy. In one example, the key hierarchy may be based on a structure of the network. For example, parent network node 215 may be identified as a network node and/or network function that manages one or more aspects of network node 210 or that obtains integrity verification information for network node 210. Additionally or alternatively, parent network node 215 may be identified as a network node and/or network function that is configured to verify the integrity of network node 210. Thus, for example, a CP-CN function may be considered a parent network node for an access node function (e.g., a base station). As another example, a security anchor function (e.g., a CP-AU function) may be considered a parent network node to a CP-CN function. As yet another example, a HSS function may be considered as a parent network node to a security anchor function (e.g., a CP-AU, a security gateway, etc.). UE 205 may store the key hierarchy based on one or more types of suitable information such as, for example, information received during the initial connection procedure, information received from a network entity, etc. In another example, UE 205 may request the key hierarchy from a network entity on demand, e.g., when the security context has been established more than the threshold time.

At 235, UE 205 may transmit one or more key refresh request messages to the parent network node 215. The key refresh request message(s) may trigger a key refresh procedure between the parent network node 215 and the network node 210. In some aspects, the key refresh message(s) may include an identifier of the network node 210.

In the example where the parent network node 215 is a CP-CN function and the network node is an access node, a network access stratum (NAS) message may be used as the key refresh message. The NAS message may include an "AN key refresh" message type that triggers the key refresh between the CP-CN and the AN. The NAS message may be ciphered and integrity protected.

In the example where the parent network node 215 is a security anchor function (e.g., a CP-AU function) and the network node is a CP-CN function, an attach request message may be used as the key refresh message. The attach request message may include an evolved key set identifier (eKSI) based on which security anchor function derives a fresh CP-CN key. In some aspects, the eKSI may be assigned by the security anchor function to the UE 205 during the initial attach procedure and may be used to identify a root key when multiple root keys are available at the security anchor function. For example, the security anchor function may receive multiple authentication vectors (AVs) from HSS and/or an authentication, authorization, and accounting (AAA) function of the core network.

In some aspects, the attach request message may include an identifier associated with UE 205. In one example, the attach request message may include an international mobile subscriber identity (IMSI) or some other identifier associated with UE 205. The identifying information may be used by HSS/AAA function of the network to identify UE 205.

In another example, UE 205 may use a new message format to request for a new authentication procedure (e.g., receive authentication information) from HSS/AAA functions. In one aspect, the key refresh request message in this context may include an authentication request message. In some examples, the security anchor function may not remove the existing security context, but may instead update the key based on the re-authentication.

In the example where the parent network node 215 is a security anchor function, a new authentication request message to the security anchor function may be used as the key refresh message.

In one aspect, when EAP re-authentication is supported by the security anchor function, the key refresh request message may include an extensible authentication protocol (EAP) initiate/re-authentication message.

In some examples, UE 205 may be limited to a predetermined number of key refresh messages within a certain time period. Thus, key refresh request messages transmitted above the applicable limit may be ignored and/or may trigger a re-authentication procedure for the UE 205.

At 240, once parent network node 215 receives the key refresh request message, parent network node 215 uses this message to identify the network node 210 as having a security context with UE 205. For example, parent network node 215 may store information associating the UE 205 identity with security contexts held between the UE 205 and other network nodes.

At 245, parent network node 215 may obtain integrity verification information associated with the network node 210. This may include performing a remote attestation procedure with network node 210. Alternatively or additionally, parent network node 215 may obtain the integrity verification information based on information received from another network entity (e.g., HSS).

In some examples, the integrity verification information may be obtained according to a predetermined schedule (e.g., periodically) and/or based on receipt of the key refresh request message. Thus, in some aspects the integrity verification information for the network node 210 may not be performed in response to the key refresh request message. Instead, it may be done periodically by the parent network node 215. Furthermore, the integrity verification may be performed by another network entity and made available to the parent network node 215.

At 247, parent network node 215 may perform a key refresh procedure for the network node 210. This may include obtaining the integrity verification information from the network node 210, and performing the key refresh procedure based at least in part on the integrity verification information.

At 250, parent network node 215 may identify and convey an indication of a procedure to be performed between the network node 210 and the UE 205. In some examples, the procedure may be a re-authentication procedure. The indication may be conveyed in one or more messages to network node 210 and/or to UE 205.

At 255 the UE 205 and the network node 210 may perform a procedure to establish a new security context (e.g., to establish a new key). In some examples, the procedure may be a re-authentication procedure. Thus, UE 205 sends a request for a key refresh to the parent network node 215 (at 235) in order to refresh a key of network node 210. The key for network node 210 may then be refreshed (at 247) by its parent network node 215. Subsequently, re-authentication procedure is performed between UE 205 and network node 210.

In some aspects, user plane traffic may be protected for a predetermined time period after the key refresh procedure using the original security context. For example, the network node 210 may send a trigger indicating when the new security context will begin. This may avoid re-ciphering protocol data units (PDUs) previously ciphered using the original security context.

Thus, in some aspects after the key refresh procedure has completed, the original security context (e.g., the key that was used before the key refresh procedure) may be used for user-plane packet protection for a predefined time interval. In some aspects, after the predefined time interval, the use of the new key for ciphering and/or integrity protection may be indicated in a PDU.

Figure 3:
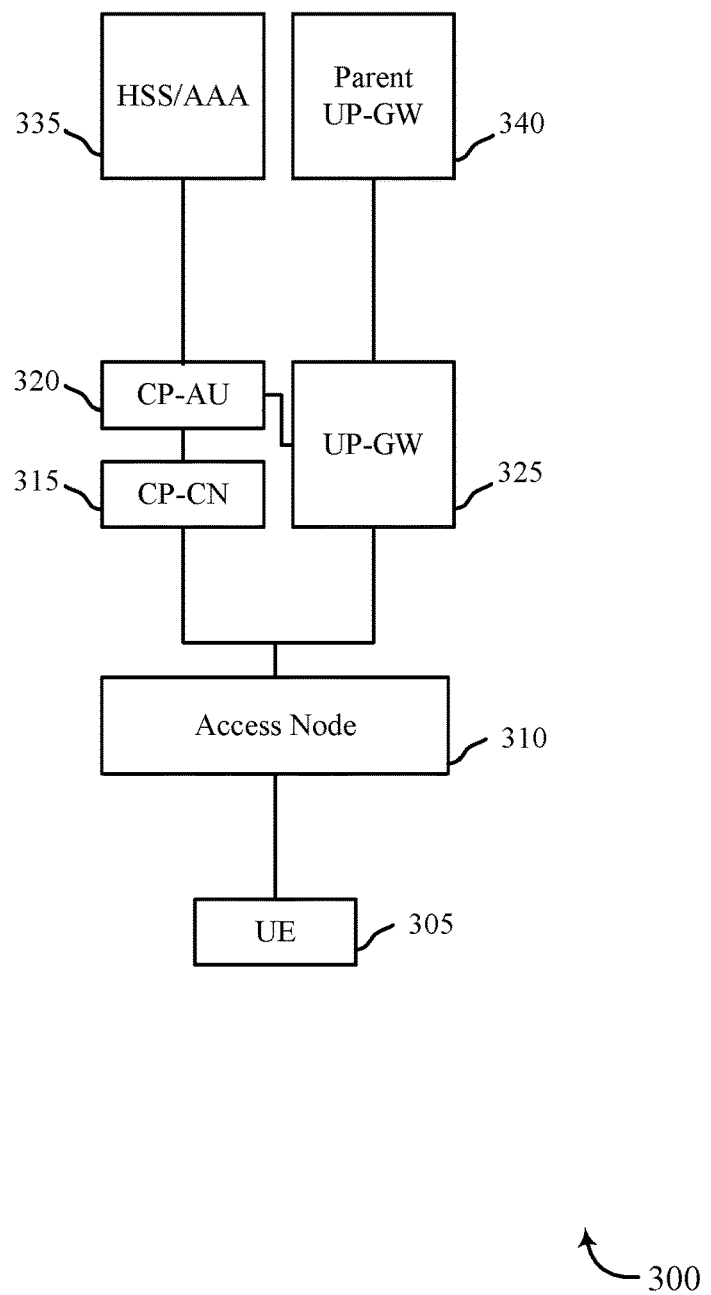
FIG. 3 illustrates an example of a wireless communication system that supports on-demand network function re-authentication based on key refresh in accordance with aspects of the present disclosure.

FIG. 3 illustrates an example of a wireless communication system 300 for on-demand network function re-authentication based on key refresh. Wireless communication system 300 may implement one or more aspects of wireless communication system 100 and/or process flow 200 described above. Wireless communication system 300 may include an UE 305, an access node 310, a CP-CN function 315, a CP-AU function 320, a UP-GW function 325, a HSS/AAA function 335, and a parent UP-GW 340, which may be examples of the corresponding devices described above.

Access node 310 may include one or more base stations, cells, eNB, etc. For example, UE 305 may communicate with access node 310 wirelessly using one or more radio access technologies (RATs). Access node 310 may maintain a security context for a radio resource control (RRC) connection, user plane, etc.

CP-CN function 315 may include or manage one or more aspects of mobility management (MM) functions and/or session management (SM) functions as well as maintaining the corresponding security contexts. CP-AU function 320 may be an example of a security anchor function and may perform authentication and maintain the authentication root key from which subsequent keys may be derived. UP-GW function 325 may maintain the user plane security context (e.g., key) when user plane security terminates at UP-GW function 325. The user plane security may be terminated by the access node 310 and/or UP-GW function 325 and may be configured by the network.

For example, each of the access node 310, the CP-CN function 315, CP-AU function 320 and/or UP-GW function 325 may be considered a network node with which UE 305 may maintain a security context. Moreover, HSS/AAA function 335 may be considered a parent network node with respect to CP-AU function 320, SP-CN 315, and/or access node 310. CP-AU function 320 may be considered a parent network node with respect to CP-CN function 315, UP-GW function 325, and/or access node 310. CP-CN may be considered a parent network node with respect to access node 310. Additionally, parent UP-GW 340 may be considered a parent network node with respect to UP-GW function 325.

UE 305 may maintain security contexts with one or more network nodes, e.g., access node 310, CP-CN function 315, CP-AU function 320, and/or UP-GW function 325. UE 305 may determine that at least one of the security contexts between UE 305 and the network node has been established for more than the time threshold. UE 305 may use a key hierarchy to identify the parent network node, e.g., CP-AU function 320 with respect to CP-CN function 315, CP-CN 315 with respect to access node 310, etc. UE 305 may transmit the key refresh message to the parent network node to trigger the key refresh procedure between the parent network node and the network node. The parent network node receives the key refresh request message and identifies the network node based on the key refresh request message, e.g., using the identity of UE 305. The parent network node performs the key refresh procedure by obtaining an integrity verification information associated with the network node. Based on the key refresh procedure, the UE 305 and the network node perform a procedure to establish a new security context between the UE 305 and the network node. In some examples, the procedure may be a re-authentication procedure.

Figure 4:
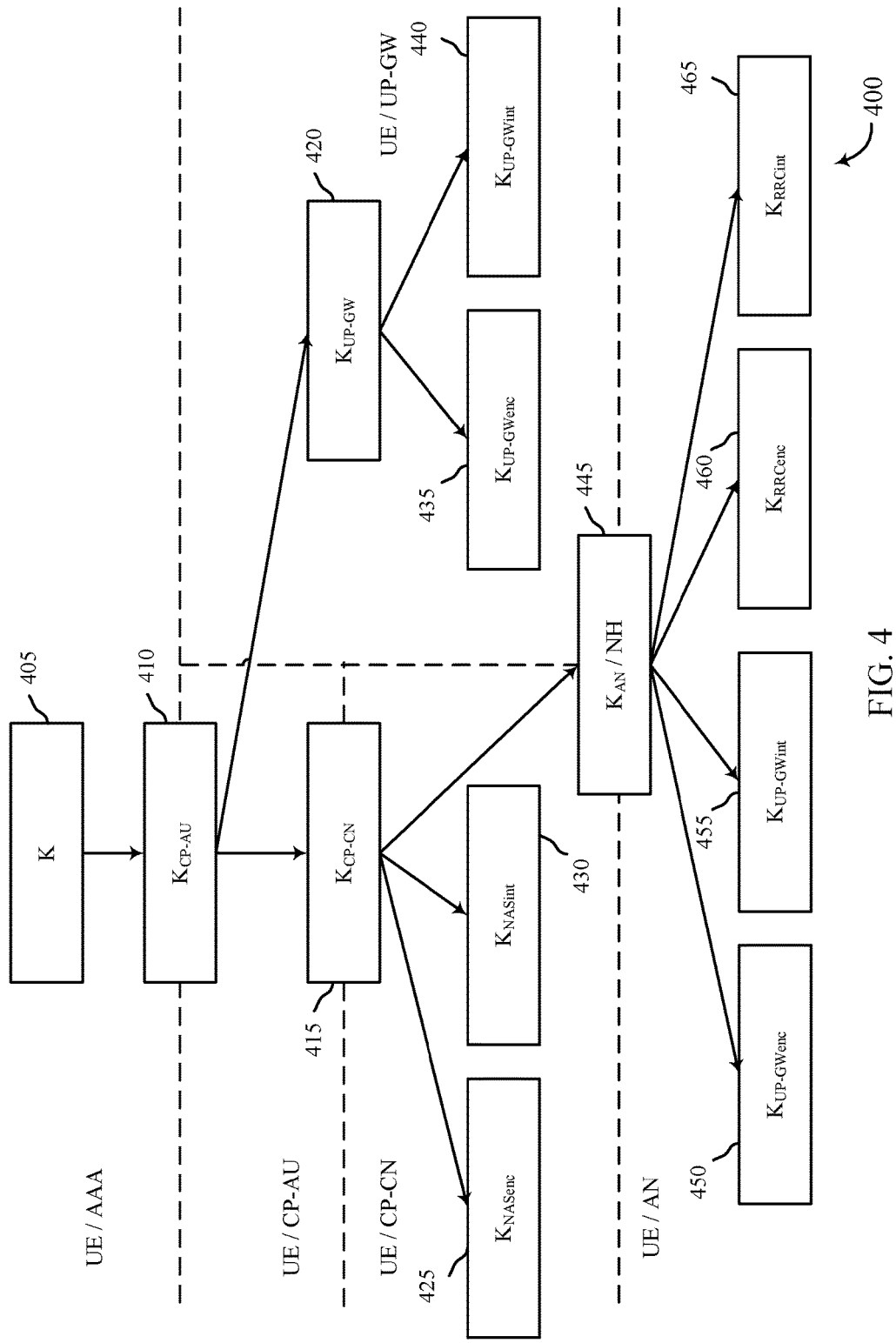
FIG. 4 illustrates an example of a key hierarchy that supports on-demand network function re-authentication based on key refresh in accordance with aspects of the present disclosure.

FIG. 4 illustrates an example of a key hierarchy 400 for on-demand network function re-authentication based on key refresh. Key hierarchy 400 may implement one or more aspects of wireless communication systems 100 and 300 and/or process flow 200 discussed above. For example, a UE and/or network nodes may use the key hierarchy 400 to implement one or more aspects of the on-demand network function re-authentication based on key refresh.

For example, the key hierarchy 400 illustrates another example of identifying a parent network node with respect to a network node. Key hierarchy 400 may include a K root key 405 that is used as a security context between the HSS/AAA function and the UE. The K root key 405 may be used by the HSS/AAA function to derive a $K_{CP\text{-}AU}$ key 410 for the security anchor function (such as a CP-AU function). The $K_{CP\text{-}AU}$ key 410 may be maintained by the security anchor function and the UE.

The $K_{CP\text{-}AU}$ key 410 may be used by the security anchor function to derive the $K_{CP\text{-}CN}$ key 415 and the $K_{UP\text{-}GW}$ key 420. The $K_{CP\text{-}CN}$ key 415 may be maintained by the CP-CN function and the UE. The $K_{UP\text{-}GW}$ key 420 may be maintained by the UP-GW function and the UE. The $K_{UP\text{-}GW}$ key 420 may be used by the UP-GW to establish the $K_{UP\text{-}GWenc}$ key 435 and the $K_{UP\text{-}GWint}$ key 440. The $K_{UP\text{-}GWenc}$ key 435 and the $K_{UP\text{-}GWint}$ key 440 may be used for integrity protection and encoding of user plane packet.

The $K_{CP\text{-}CN}$ key 415 may be used by the CP-CN function to derive the $K_{AN}$/NH key 445. The $K_{AN}$/NH key 445 may be used by the access node to derive the $K_{UP\text{-}GWenc}$ key 450, the $K_{UP\text{-}GWint}$ key 455, the $K_{RRCenc}$ key 460, and the $K_{RRCint}$ key 465, that may be used for integrity protection and encoding of RRC and user plane packets.

As discussed above, a UE may transmit a key refresh request message to a parent network node to trigger a key refresh procedure between the parent network node and the network node. As one example, the $K_{CP\text{-}AU}$ key 410 may be used to refresh the $K_{CP\text{-}CN}$ key 415 and/or the $K_{UP\text{-}GW}$ key 420. Therefore, the CP-AU function may be considered a parent network node with respect to the CP-CN function and/or the UP-GW function, which may be considered network nodes. As another example, the $K_{CP\text{-}CN}$ key 415 may be used to refresh the $K_{an}$/NH key 445. Therefore, the CP-CN function may be considered a parent network node with respect to the access node function, which may be considered a network node in this aspect.

Figure 5:
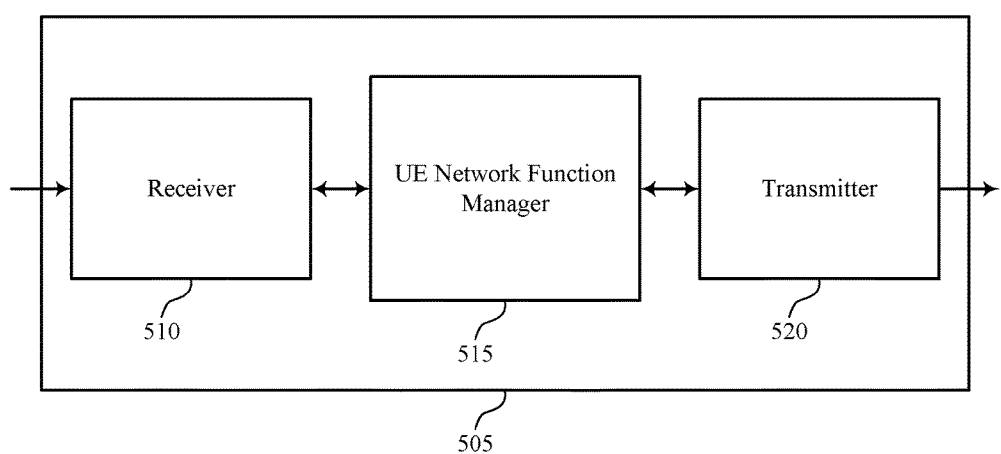
FIGS. 5 through 7 show block diagrams of a device that supports on-demand network function re-authentication based on key refresh in accordance with aspects of the present disclosure.

FIG. 5 shows a block diagram 500 of a wireless device 505 that supports on-demand network function re-authentication based on key refresh in accordance with various aspects of the present disclosure. Wireless device 505 may be an example of aspects of a UE 115 as described with reference to FIGS. 1 through 4. Wireless device 505 may include receiver 510, UE network function manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to on-demand network function re-authentication based on key refresh, etc.). Information may be passed on to other components of the device. The receiver 510 may be an example of aspects of the transceiver 835 described with reference to FIG. 8.

UE network function manager 515 may be an example of aspects of the UE network function manager 815 described with reference to FIG. 8.

UE network function manager 515 may determine, by the UE, that a security context with a network node has been established for more than a threshold time period. UE network function manager 515 may identify, based on a key hierarchy, at least one parent network node associated with the network node. UE network function manager 515 may transmit a key refresh request message from the UE to the identified parent network node to trigger a key refresh procedure between the identified parent network node and the network node. The key refresh message may be protected (e.g., ciphered and/or integrity protected based on the security context established with the parent node). Additionally or alternatively, the UE may transmit a key refresh message to the network node that triggers the network node to obtain a fresh key from the parent node, e.g., when the UE may not have a direct connection to the parent network node. UE network function manager 515 may perform a procedure with the network node to establish a new security context based on the key refresh procedure.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
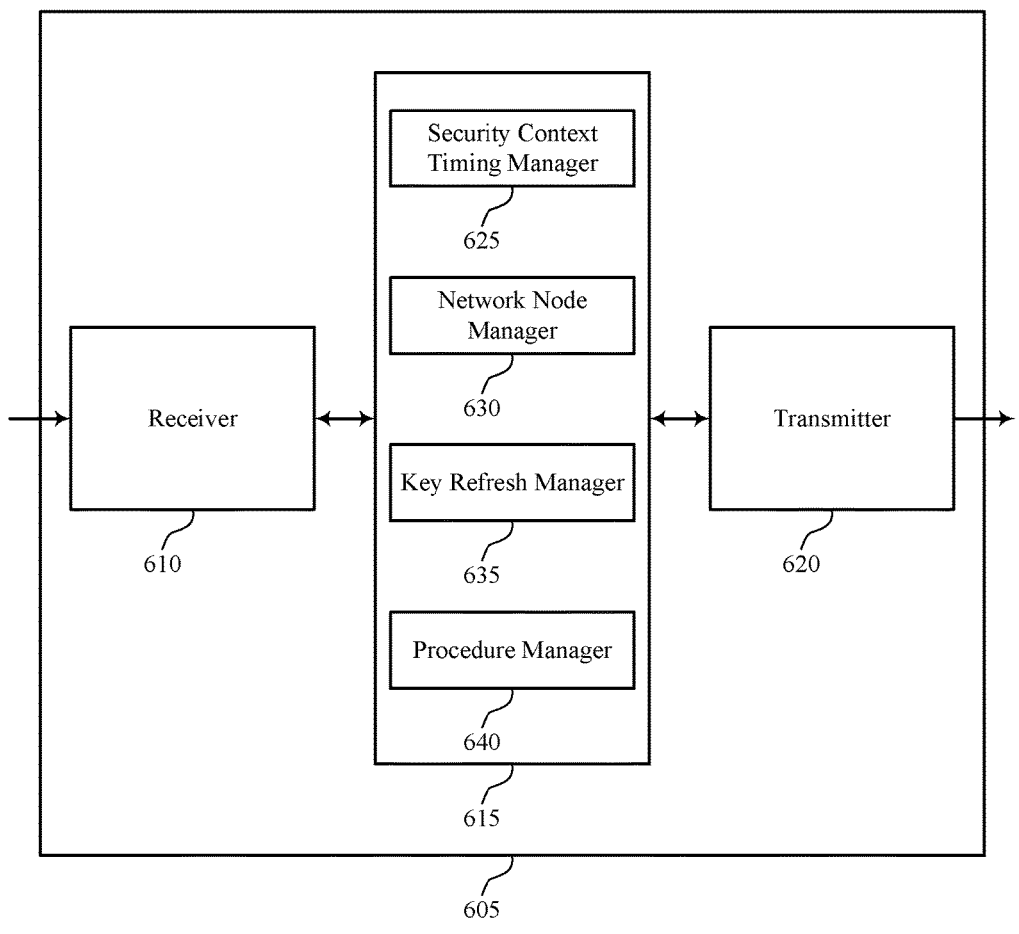

FIG. 6 shows a block diagram 600 of a wireless device 605 that supports on-demand network function re-authentication based on key refresh in accordance with various aspects of the present disclosure. Wireless device 605 may be an example of aspects of a wireless device 505 or a UE 115 as described with reference to FIGS. 1 through 5. Wireless device 605 may include receiver 610, UE network function manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to on-demand network function re-authentication based on key refresh, etc.). Information may be passed on to other components of the device. The receiver 610 may be an example of aspects of the transceiver 835 described with reference to FIG. 8.

UE network function manager 615 may be an example of aspects of the UE network function manager 815 described with reference to FIG. 8. UE network function manager 615 may also include security context timing manager 625, network node manager 630, key refresh manager 635, and procedure manager 640.

Security context timing manager 625 may determine, by a UE, that a security context with a network node has been established for more than a threshold time period.

Network node manager 630 may identify, based on a key hierarchy, at least one parent network node associated with the network node. In one aspect, the parent network node includes a CP-CN function and the network node includes an access node. In one aspect, the key refresh request message includes a NAS message. In one aspect, the parent network node includes a security anchor function and the network node includes a CP-CN function. In one aspect, the security anchor function includes a CP-AU function. In one aspect, the key refresh request message includes an attach request message. In one aspect, the attach request message includes an identifier associated with the UE. In one aspect, the key refresh message includes a registration request message. In one aspect, the key refresh request message includes an re-authentication request message. In one aspect, the key refresh request message includes an EAP re-authentication message.

Key refresh manager 635 may transmit a key refresh request message from the UE to the identified parent network node to trigger a key refresh procedure between the identified parent network node and the network node.

Procedure manager 640 may perform a procedure with the network node to establish a new security context based on the key refresh procedure. In some examples, the procedure may be a re-authentication procedure.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
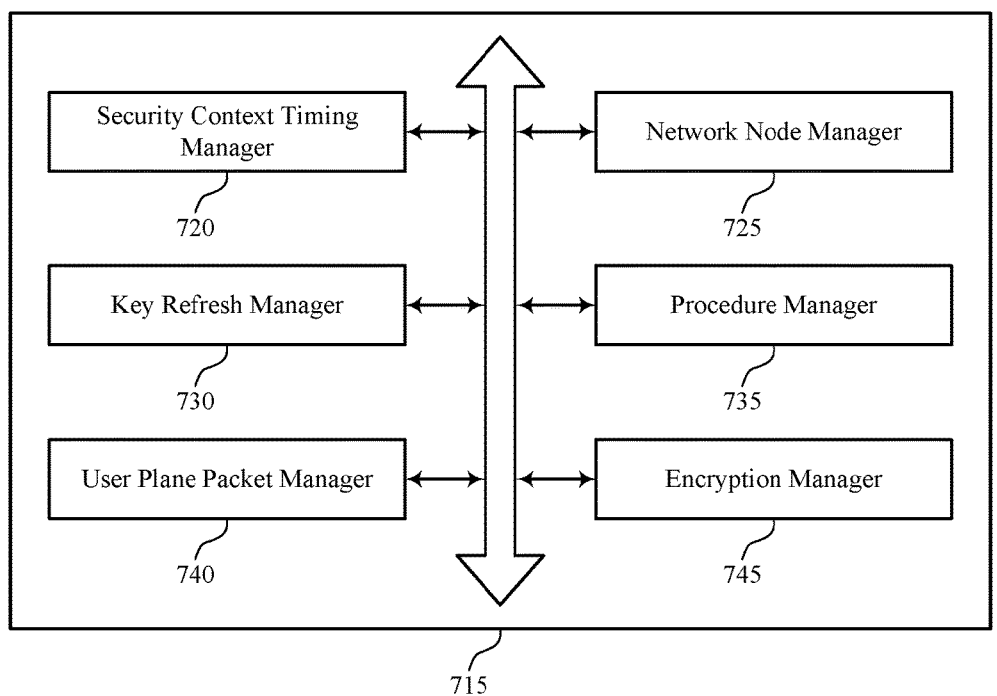

FIG. 7 shows a block diagram 700 of a UE network function manager 715 that supports on-demand network function re-authentication based on key refresh in accordance with various aspects of the present disclosure. The UE network function manager 715 may be an example of aspects of a UE network function manager 515, a UE network function manager 615, or a UE network function manager 815 described with reference to FIGS. 5, 6, and 8. The UE network function manager 715 may include security context timing manager 720, network node manager 725, key refresh manager 730, procedure manager 735, user plane packet manager 740, and encryption manager 745. Each of these modules may communicate, directly or indirectly, with one another (e.g., via one or more buses).

Security context timing manager 720 may determine, by the UE, that a security context with a network node has been established for more than a threshold time period.

Network node manager 725 may identify, based on a key hierarchy, at least one parent network node associated with the network node. In one aspect, the parent network node includes a CP-CN function and the network node includes an access node. In one aspect, the parent network node includes a security anchor function and the network node includes a CP-CN function. In one aspect, the security anchor function includes a CP-AU function.

Key refresh manager 730 may transmit a key refresh request message from the UE to the identified parent network node to trigger a key refresh procedure between the identified parent network node and the network node. In one aspect, the key refresh request message includes a NAS message. In one aspect, the key refresh request message includes an attach request message. In one aspect, the attach request message includes an identifier associated with the UE. In one aspect, the key refresh request message includes an re-authentication request message. In one aspect, the key refresh request message includes an EAP re-authentication message.

Procedure manager 735 may perform a procedure with the network node to establish a new security context based on the key refresh procedure. In some examples, the procedure may be a re-authentication procedure.

User plane packet manager 740 may use, for a predetermined time period after the key refresh procedure, the security context for user plane packet protection.

Encryption manager 745 may perform at least one of encrypting the key refresh request message, integrity-protecting the key refresh request message, or combinations thereof.

Figure 8:
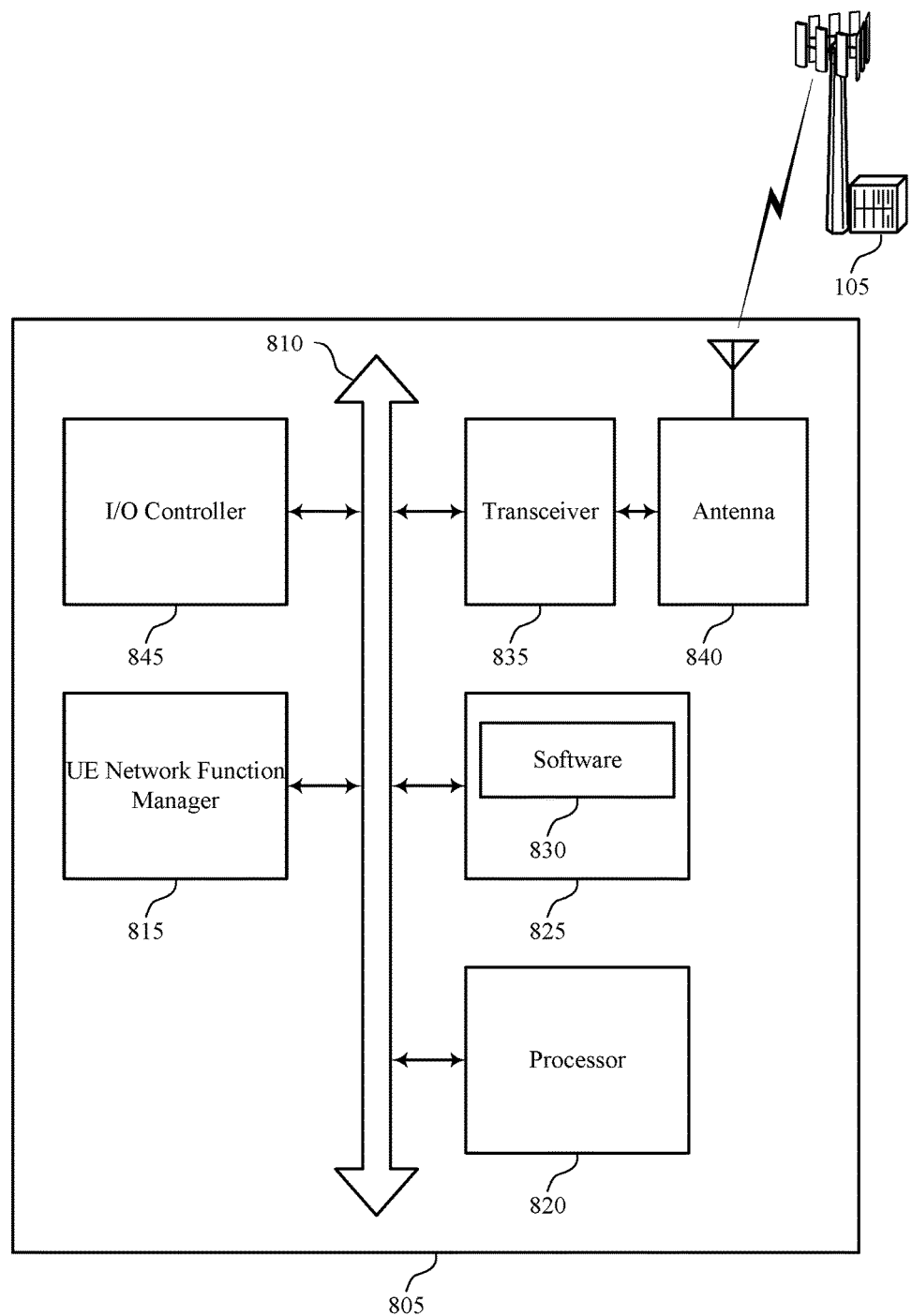
FIG. 8 illustrates a block diagram of a system including a UE that supports on-demand network function re-authentication based on key refresh in accordance with aspects of the present disclosure.

FIG. 8 shows a diagram of a system 800 including a device 805 that supports on-demand network function re-authentication based on key refresh in accordance with various aspects of the present disclosure. Device 805 may be an example of or include the components of wireless device 505, wireless device 605, or a UE 115 as described above, e.g., with reference to FIGS. 1 through 6. Device 805 may include components for bi-directional voice and data communications including components for transmitting and receiving communications, including UE network function manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In one aspect, processor 820 may be configured to operate a memory array using a memory controller. In one aspect, a memory controller may be integrated into processor 820. Processor 820 may be configured to execute computer-readable instructions stored in a memory to perform various functions (e.g., functions or tasks supporting on-demand network function re-authentication based on key refresh).

Memory 825 may include random access memory (RAM) and read only memory (ROM). The memory 825 may store computer-readable, computer-executable software 830 including instructions that, when executed, cause the processor to perform various functions described herein. In one aspect, the memory 825 may contain, among other things, a basic input/output system (BIOS) that may control basic hardware and/or software operation such as the interaction with peripheral components or devices.

Software 830 may include code to implement aspects of the present disclosure, including code to support on-demand network function re-authentication based on key refresh. Software 830 may be stored in a non-transitory computer-readable medium such as system memory or other memory. In one aspect, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In one aspect, the wireless device may include a single antenna 840. However, in one aspect the device may have more than one antenna 840, that may be capable of concurrently transmitting or receiving multiple wireless transmissions.

I/O controller 845 may manage input and output signals for device 805. I/O controller 845 may also manage peripherals not integrated into device 805. In one aspect, I/O controller 845 may represent a physical connection or port to an external peripheral. In one aspect, I/O controller 845 may utilize an operating system such as iOS®, ANDROID®, MS-DOS®, MS-WINDOWS®, OS/2®, UNIX®, LINUX®, or another known operating system.

Figure 9:
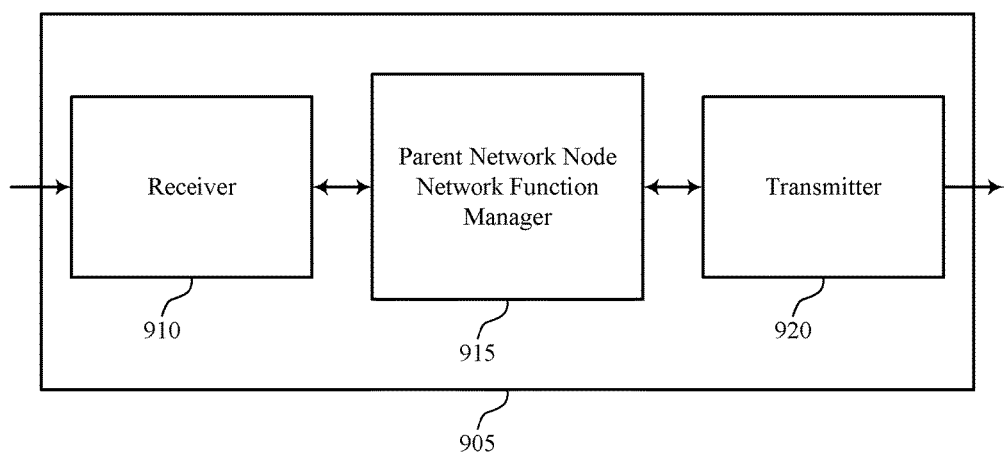
FIGS. 9 through 11 show block diagrams of a device that supports on-demand network function re-authentication based on key refresh in accordance with aspects of the present disclosure.

FIG. 9 shows a block diagram 900 of a wireless device 905 that supports on-demand network function re-authentication based on key refresh in accordance with various aspects of the present disclosure. Wireless device 905 may be an example of aspects of a parent network node as described with reference to FIGS. 1 through 4. Wireless device 905 may include receiver 910, parent network node network function manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to on-demand network function re-authentication based on key refresh, etc.). Information may be passed on to other components of the device. The receiver 910 may be an example of aspects of the transceiver 1235 described with reference to FIG. 12.

Parent network node network function manager 915 may be an example of aspects of the parent network node network function manager 1215 described with reference to FIG. 12.

Parent network node network function manager 915 may receive, at a parent network node, a key refresh request message from a UE. The key refresh message may be ciphered and/or integrity protected based on a security context established between the parent network node and the UE. In some aspects, the key refresh procedure may be triggered by the UE, but may be requested by the network node. Parent network node network function manager 915 may identify, based on the key refresh request message, a network node having a security context with the UE. Parent network node network function manager 915 may obtain an integrity verification information associated with identified network node. Parent network node network function manager 915 may identify a procedure to be performed between the network node and the UE to establish a new security context. In some examples, the procedure may be a re-authentication procedure.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
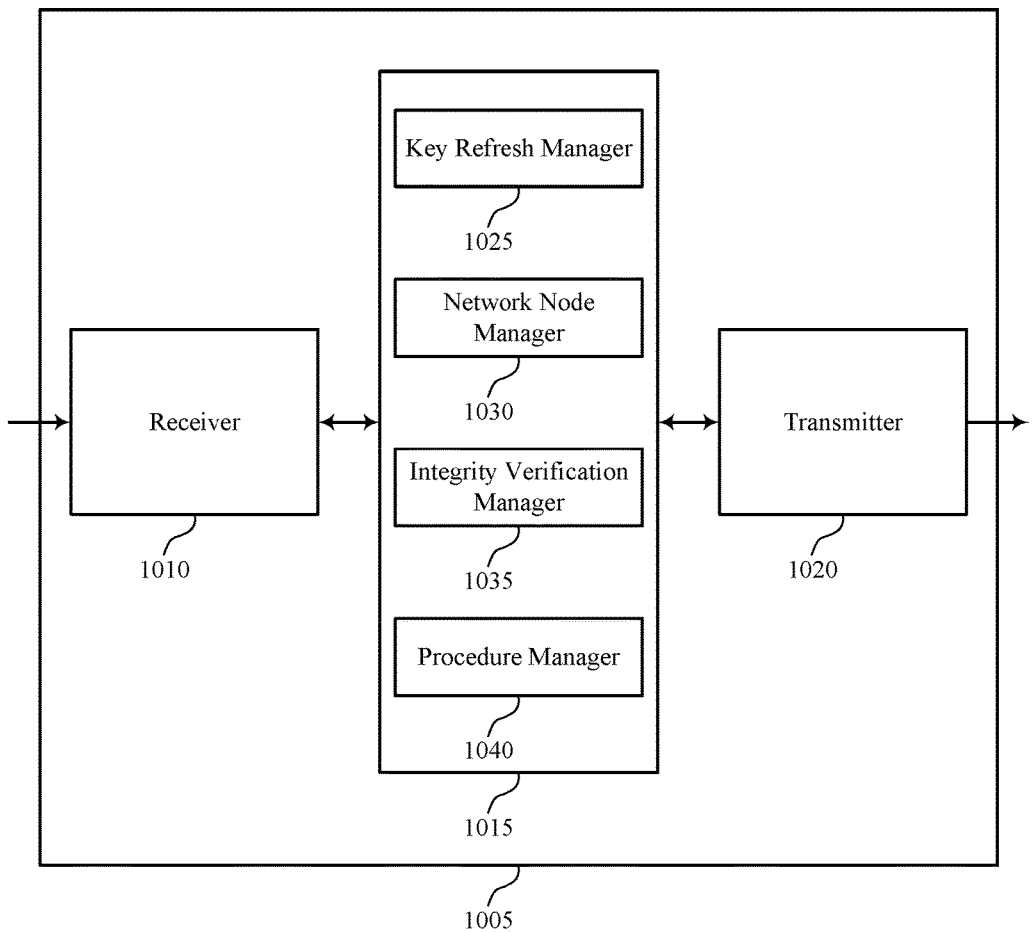

FIG. 10 shows a block diagram 1000 of a wireless device 1005 that supports on-demand network function re-authentication based on key refresh in accordance with various aspects of the present disclosure. Wireless device 1005 may be an example of aspects of a wireless device 905 or a parent network node as described with reference to FIGS. 1 through 4 and 9. Wireless device 1005 may include receiver 1010, parent network node network function manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to on-demand network function re-authentication based on key refresh, etc.). Information may be passed on to other components of the device. The receiver 1010 may be an example of aspects of the transceiver 1235 described with reference to FIG. 12.

Parent network node network function manager 1015 may be an example of aspects of the parent network node network function manager 1215 described with reference to FIG. 12.

Parent network node network function manager 1015 may also include key refresh manager 1025, network node manager 1030, integrity verification manager 1035, and procedure manager 1040.

Key refresh manager 1025 may receive, at a parent network node, a key refresh request message from a UE. Key refresh manager 1025 may determine that a predetermined number of key refresh request messages have been received from the UE during a threshold time period, and refrain from initiating the procedure based on the determining. In some examples, the procedure may be a re-authentication procedure.

Network node manager 1030 may identify, based on the key refresh request message, a network node having a security context with the UE. In one aspect, the parent network node includes a CP-CN function and the network node includes an access node. In one aspect, the key refresh request message includes a NAS message. In one aspect, the parent network node includes a security anchor function and the network node includes a CP-CN function. In one aspect, the security anchor function includes a CP-AU function. In one aspect, the key refresh request message includes an attach request message, the attach request message including a UE identifier and a key identifier received from the security anchor function during an initial attach procedure. In one aspect, the key identifier includes an eKSI. In one aspect, the attach request message includes an identifier associated with the UE. In one aspect, the key refresh request message includes an re-authentication request message.

Integrity verification manager 1035 may obtain an integrity verification information associated with identified network node. Obtaining the integrity verification information includes performing an integrity verification procedure between the parent network node and the network node, or receiving the integrity verification information from another network entity, or combinations thereof. In one aspect, the integrity verification procedure is performed according to a predetermined schedule, or based on receipt of the key refresh request message, or combinations thereof. In one aspect, the integrity verification information is based on a remote attestation procedure.

Procedure manager 1040 may identify a procedure to be performed between the network node and the UE to establish a new security context. In some examples, the procedure may be a re-authentication procedure.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
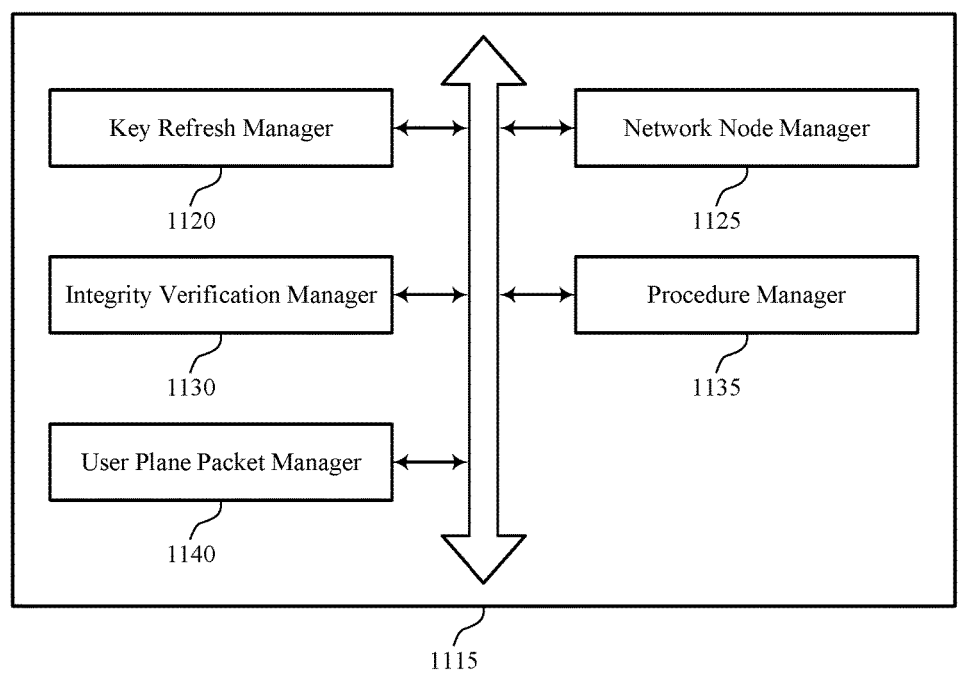

FIG. 11 shows a block diagram 1100 of a parent network node network function manager 1115 that supports on-demand network function re-authentication based on key refresh in accordance with various aspects of the present disclosure. The parent network node network function manager 1115 may be an example of aspects of a parent network node network function manager 1215 described with reference to FIGS. 9, 10, and 12. The parent network node network function manager 1115 may include key refresh manager 1120, network node manager 1125, integrity verification manager 1130, procedure manager 1135, and user plane packet manager 1140. Each of these modules may communicate, directly or indirectly, with one another (e.g., via one or more buses).

Key refresh manager 1120 may receive, at a parent network node, a key refresh request message from a UE. Key refresh manager 1120 may determine that a predetermined number of key refresh request messages have been received from the UE during a threshold time period, and refrain from initiating the procedure based on the determining.

Network node manager 1125 may identify, based on the key refresh request message, a network node having a security context with the UE. In one aspect, the parent network node includes a CP-CN function and the network node includes an access node. In one aspect, the key refresh request message includes a NAS message. In one aspect, the parent network node includes a security anchor function and the network node includes a CP-CN function. In one aspect, the security anchor function includes a CP-AU function. In one aspect, the key refresh request message includes an attach request message, the attach request message including a UE identifier and a key identifier received from the security anchor function during an initial attach procedure. In one aspect, the key identifier includes an eKSI. In one aspect, the attach request message includes an identifier associated with the UE. In one aspect, the key refresh request message includes an re-authentication request message.

Integrity verification manager 1130 may obtain an integrity verification information associated with the identified network node. Obtaining the integrity verification information includes performing an integrity verification procedure between the parent network node and the network node, or receiving the integrity verification information from another network entity, or combinations thereof. In one aspect, the integrity verification procedure is performed according to a predetermined schedule, or based on receipt of the key refresh request message, or combinations thereof. In one aspect, the integrity verification information is based on a remote attestation procedure.

Procedure manager 1135 may identify a procedure to be performed between the network node and the UE to establish a new security context. In some examples, the procedure may be a re-authentication procedure.

User plane packet manager 1140 may use, for a predetermined time period after a key refresh procedure, the security context for user plane packet protection. User plane packet manager 1140 may perform at least one of decrypting the key refresh request message, verifying the integrity of the key refresh request message, or combinations thereof.

Figure 12:
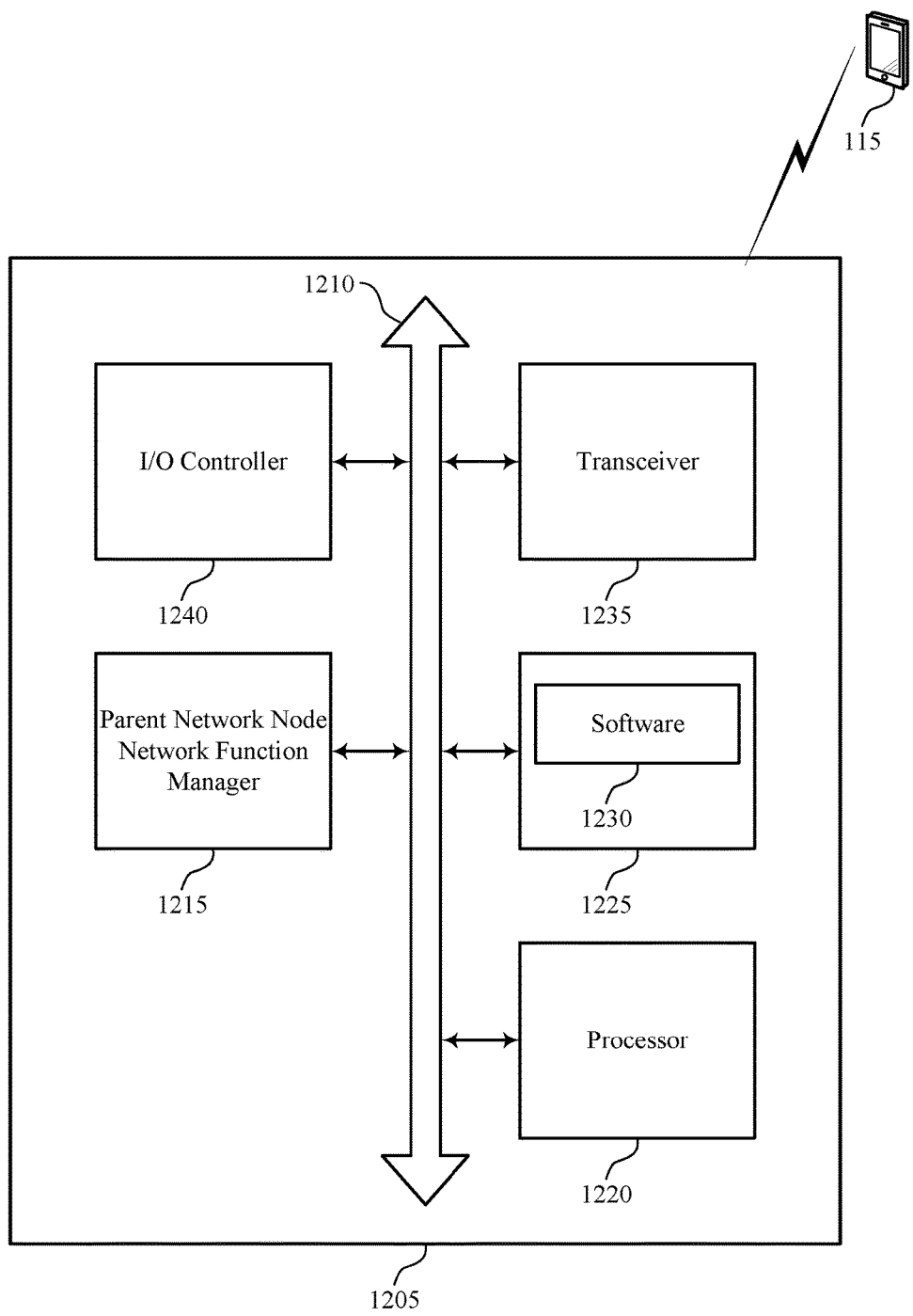
FIG. 12 illustrates a block diagram of a system including a parent network node that supports on-demand network function re-authentication based on key refresh in accordance with aspects of the present disclosure.

FIG. 12 shows a diagram of a system 1200 including a device 1205 that supports on-demand network function re-authentication based on key refresh in accordance with various aspects of the present disclosure. Device 1205 may be an example of or include the components of parent network node as described above, e.g., with reference to FIGS. 1 through 4. Device 1205 may include components for bi-directional voice and data communications including components for transmitting and receiving communications, including parent network node network function manager 1215, processor 1220, memory 1225, software 1230, transceiver 1235, and I/O controller 1240. These components may be in electronic communication via one or more busses (e.g., bus 1210).

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting on-demand network function re-authentication based on key refresh).

Memory 1225 may include RAM and ROM. The memory 1225 may store computer-readable, computer-executable software 1230 including instructions that, when executed, cause the processor to perform various functions described herein. In one aspect, the memory 1225 may contain, among other things, a BIOS that may control basic hardware and/or software operation such as the interaction with peripheral components or devices.

Software 1230 may include code to implement aspects of the present disclosure, including code to support on-demand network function re-authentication based on key refresh. Software 1230 may be stored in a non-transitory computer-readable medium such as system memory or other memory. In one aspect, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

I/O controller 1240 may manage input and output signals for device 1205. I/O controller 1240 may also manage peripherals not integrated into device 1205. In one aspect, I/O controller 1240 may represent a physical connection or port to an external peripheral. In one aspect, I/O controller 1240 may utilize an operating system such as iOS®, ANDROID®, MS-DOS®, MS-WINDOWS®, OS/2®, UNIX®, LINUX®, or another known operating system.

Figure 13:
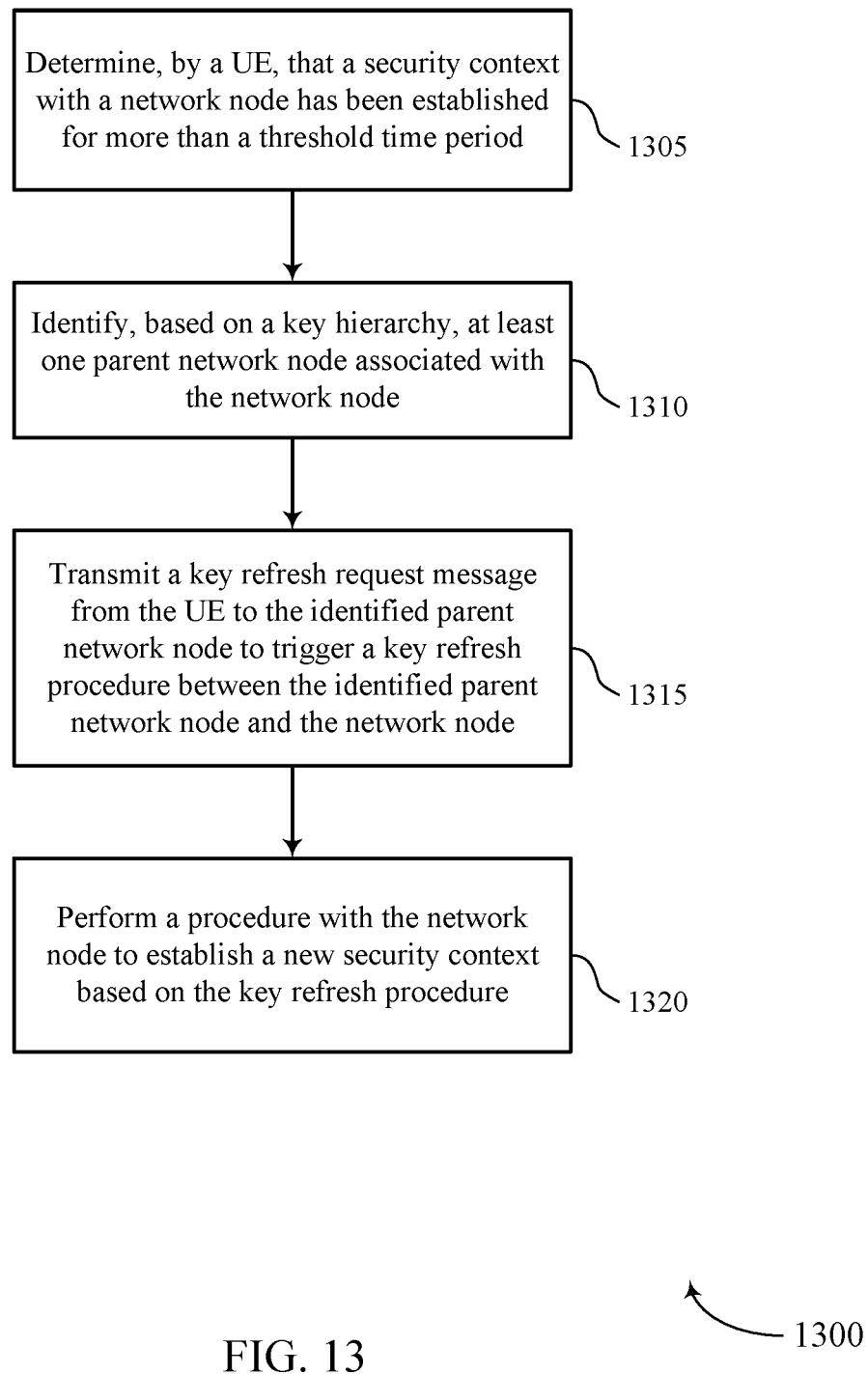
FIGS. 13 through 17 illustrate methods for on-demand network function re-authentication based on key refresh in accordance with aspects of the present disclosure.

FIG. 13 shows a flowchart illustrating a method 1300 for on-demand network function re-authentication based on key refresh in accordance with various aspects of the present disclosure. The operations of method 1300 may be implemented by a UE 115 or its components as described herein. For example, the operations of method 1300 may be performed by a UE network function manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305, the UE 115 may determine that a security context with a network node has been established for more than a threshold time period. The operations of block 1305 may be performed according to the methods described with reference to FIGS. 1 through 4. In some examples, aspects of the operations of block 1305 may be performed by a security context timing manager as described with reference to FIGS. 5 through 8.

At block 1310, the UE 115 may identify, based at least in part on a key hierarchy, at least one parent network node associated with the network node. The operations of block 1310 may be performed according to the methods described with reference to FIGS. 1 through 4. In some examples, aspects of the operations of block 1310 may be performed by a network node manager as described with reference to FIGS. 5 through 8.

At block 1315, the UE 115 may transmit a key refresh request message to the identified parent network node to trigger a key refresh procedure between the identified parent network node and the network node. The operations of block 1315 may be performed according to the methods described with reference to FIGS. 1 through 4. In some examples, aspects of the operations of block 1315 may be performed by a key refresh manager as described with reference to FIGS. 5 through 8.

At block 1320, the UE 115 may perform a procedure with the network node to establish a new security context based at least in part on the key refresh procedure. In some examples, the procedure may be a re-authentication procedure. The operations of block 1320 may be performed according to the methods described with reference to FIGS. 1 through 4. In some examples, aspects of the operations of block 1320 may be performed by a procedure manager as described with reference to FIGS. 5 through 8.

Figure 14:
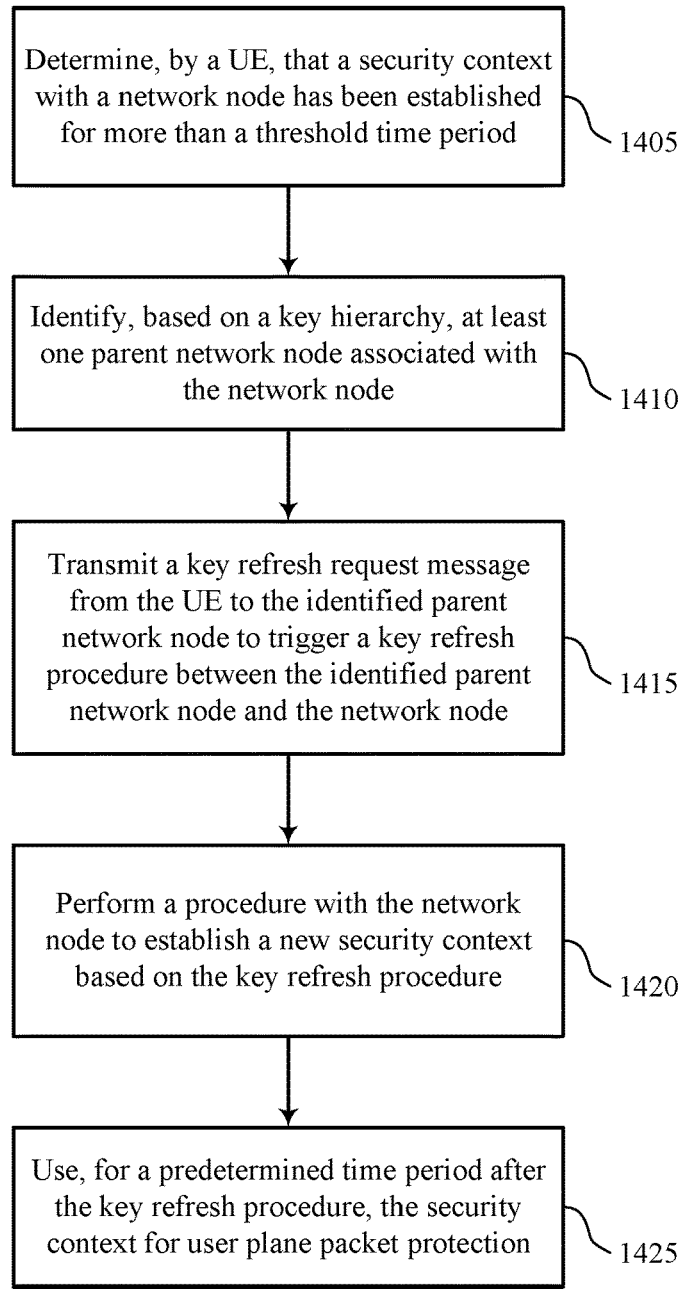

FIG. 14 shows a flowchart illustrating a method 1400 for on-demand network function re-authentication based on key refresh in accordance with various aspects of the present disclosure. The operations of method 1400 may be implemented by a UE 115 or its components as described herein. For example, the operations of method 1400 may be performed by a UE network function manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1405, the UE 115 may determine that a security context with a network node has been established for more than a threshold time period. The operations of block 1405 may be performed according to the methods described with reference to FIGS. 1 through 4. In some examples, aspects of the operations of block 1405 may be performed by a security context timing manager as described with reference to FIGS. 5 through 8.

At block 1410, the UE 115 may identify, based at least in part on a key hierarchy, at least one parent network node associated with the network node. The operations of block 1410 may be performed according to the methods described with reference to FIGS. 1 through 4. In some examples, aspects of the operations of block 1410 may be performed by a network node manager as described with reference to FIGS. 5 through 8.

At block 1415, the UE 115 may transmit a key refresh request message from the UE to the identified parent network node to trigger a key refresh procedure between the identified parent network node and the network node. The operations of block 1415 may be performed according to the methods described with reference to FIGS. 1 through 4. In some examples, aspects of the operations of block 1415 may be performed by a key refresh manager as described with reference to FIGS. 5 through 8.

At block 1420, the UE 115 may perform a procedure with the network node to establish a new security context based at least in part on the key refresh procedure. The operations of block 1420 may be performed according to the methods described with reference to FIGS. 1 through 4. In some examples, aspects of the operations of block 1420 may be performed by a procedure manager as described with reference to FIGS. 5 through 8.

At block 1425, the UE 115 may use, for a selected time period after the key refresh procedure, the security context for user plane packet protection. The operations of block 1425 may be performed according to the methods described with reference to FIGS. 1 through 4. In some examples, aspects of the operations of block 1425 may be performed by a user plane packet manager as described with reference to FIGS. 5 through 8.

Figure 15:
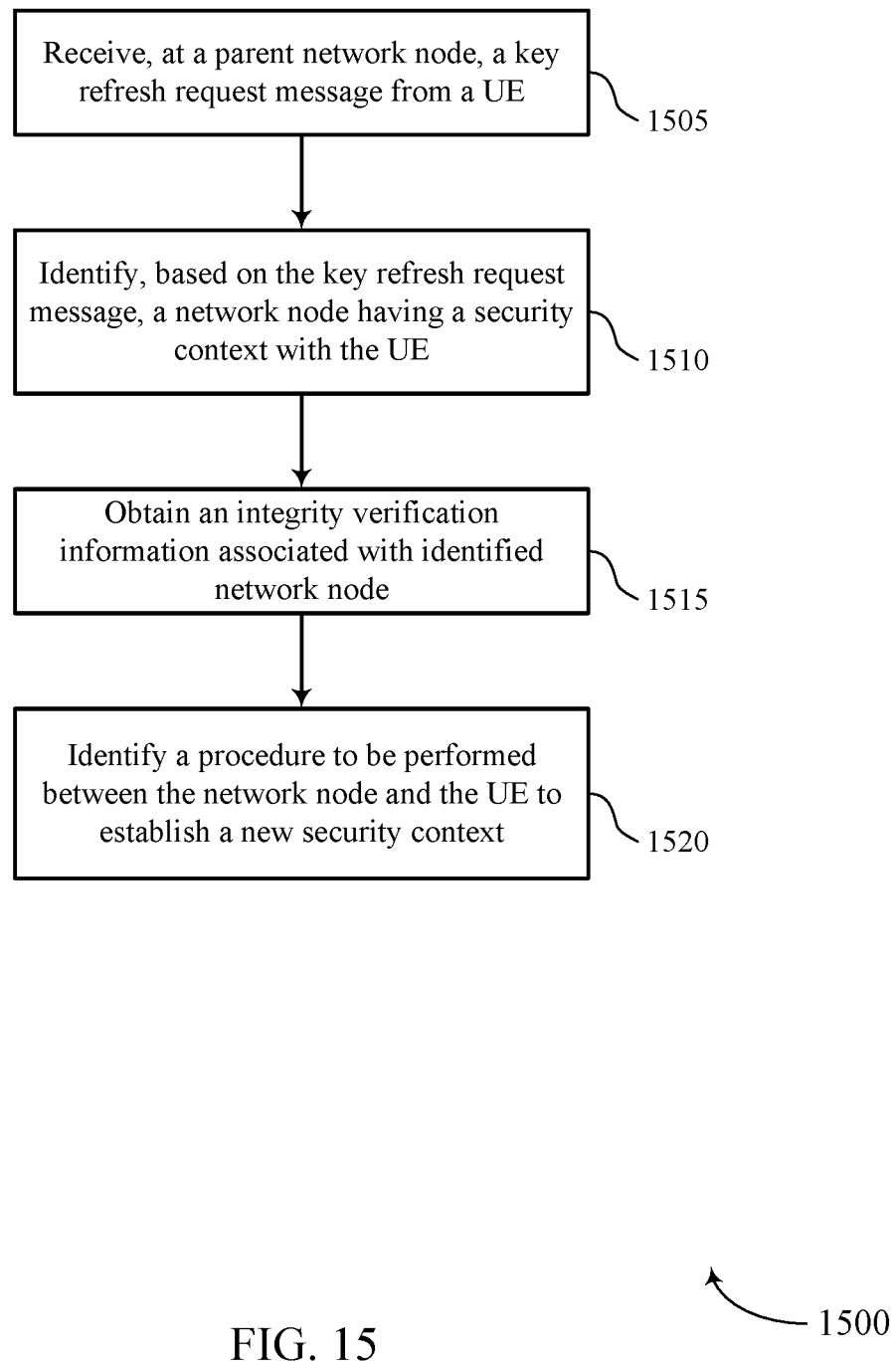

FIG. 15 shows a flowchart illustrating a method 1500 for on-demand network function re-authentication based on key refresh in accordance with various aspects of the present disclosure. The operations of method 1500 may be implemented by a parent network node or its components as described herein. For example, the operations of method 1500 may be performed by a parent network node network function manager as described with reference to FIGS. 9 through 12. In some examples, a parent network node may execute a set of codes to control the functional elements of the device to perform the functions described below. Additionally or alternatively, the parent network node may perform aspects the functions described below using special-purpose hardware.

At block 1505, the parent network node may receive a key refresh request message from a UE. The operations of block 1505 may be performed according to the methods described with reference to FIGS. 1 through 4. In some examples, aspects of the operations of block 1505 may be performed by a key refresh manager as described with reference to FIGS. 9 through 12.

At block 1510, the parent network node may identify, based at least in part on the key refresh request message, a network node having a security context with the UE. The operations of block 1510 may be performed according to the methods described with reference to FIGS. 1 through 4. In some examples, aspects of the operations of block 1510 may be performed by a network node manager as described with reference to FIGS. 9 through 12.

At block 1515, the parent network node may obtain integrity verification information associated with identified network node. The operations of block 1515 may be performed according to the methods described with reference to FIGS. 1 through 4. In some examples, aspects of the operations of block 1515 may be performed by a integrity verification manager as described with reference to FIGS. 9 through 12.

At block 1520, the parent network node may identify a procedure to be performed between the network node and the UE to establish a new security context. In some examples, the procedure may be a re-authentication procedure. The operations of block 1520 may be performed according to the methods described with reference to FIGS. 1 through 4. In some examples, aspects of the operations of block 1520 may be performed by a procedure manager as described with reference to FIGS. 9 through 12.

Figure 16:
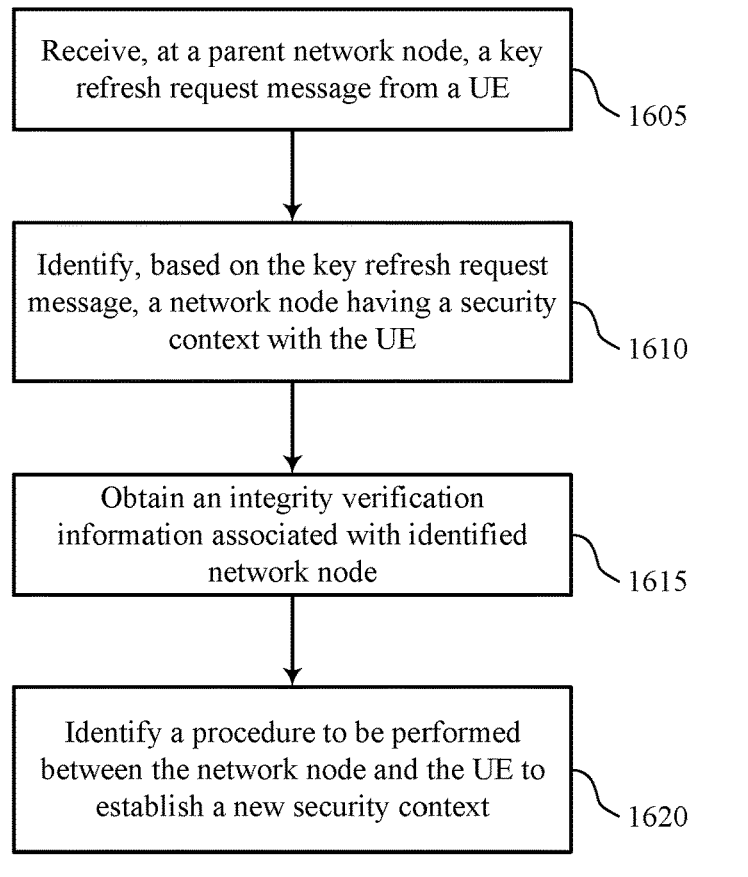

FIG. 16 shows a flowchart illustrating a method 1600 for on-demand network function re-authentication based on key refresh in accordance with various aspects of the present disclosure. The operations of method 1600 may be implemented by a parent network node or its components as described herein. For example, the operations of method 1600 may be performed by a parent network node network function manager as described with reference to FIGS. 9 through 12. In some examples, a parent network node may execute a set of codes to control the functional elements of the device to perform the functions described below. Additionally or alternatively, the parent network node may perform aspects the functions described below using special-purpose hardware.

At block 1605, the parent network node may receive a key refresh request message from a UE. The operations of block 1605 may be performed according to the methods described with reference to FIGS. 1 through 4. In some examples, aspects of the operations of block 1605 may be performed by a key refresh manager as described with reference to FIGS. 9 through 12.

At block 1610, the parent network node may identify, based at least in part on the key refresh request message, a network node having a security context with the UE. The operations of block 1610 may be performed according to the methods described with reference to FIGS. 1 through 4. In some examples, aspects of the operations of block 1610 may be performed by a network node manager as described with reference to FIGS. 9 through 12.

At block 1615, the parent network node may obtain an integrity verification information associated with identified network node. The operations of block 1615 may be performed according to the methods described with reference to FIGS. 1 through 4. In some examples, aspects of the operations of block 1615 may be performed by a integrity verification manager as described with reference to FIGS. 9 through 12.

For example, the parent network node may obtain the integrity verification information by performing an integrity verification procedure between the parent network node and the network node, or receiving the integrity verification information from another network entity, or combinations thereof. This may be performed according to the methods described with reference to FIGS. 1 through 4. In some examples, this aspect may be performed by an integrity verification manager as described with reference to FIGS. 9 through 12.

At block 1620, the parent network node may identify a procedure to be performed between the network node and the UE to establish a new security context. The operations of block 1620 may be performed according to the methods described with reference to FIGS. 1 through 4. In some examples, aspects of the operations of block 1620 may be performed by a procedure manager as described with reference to FIGS. 9 through 12.

Figure 17:
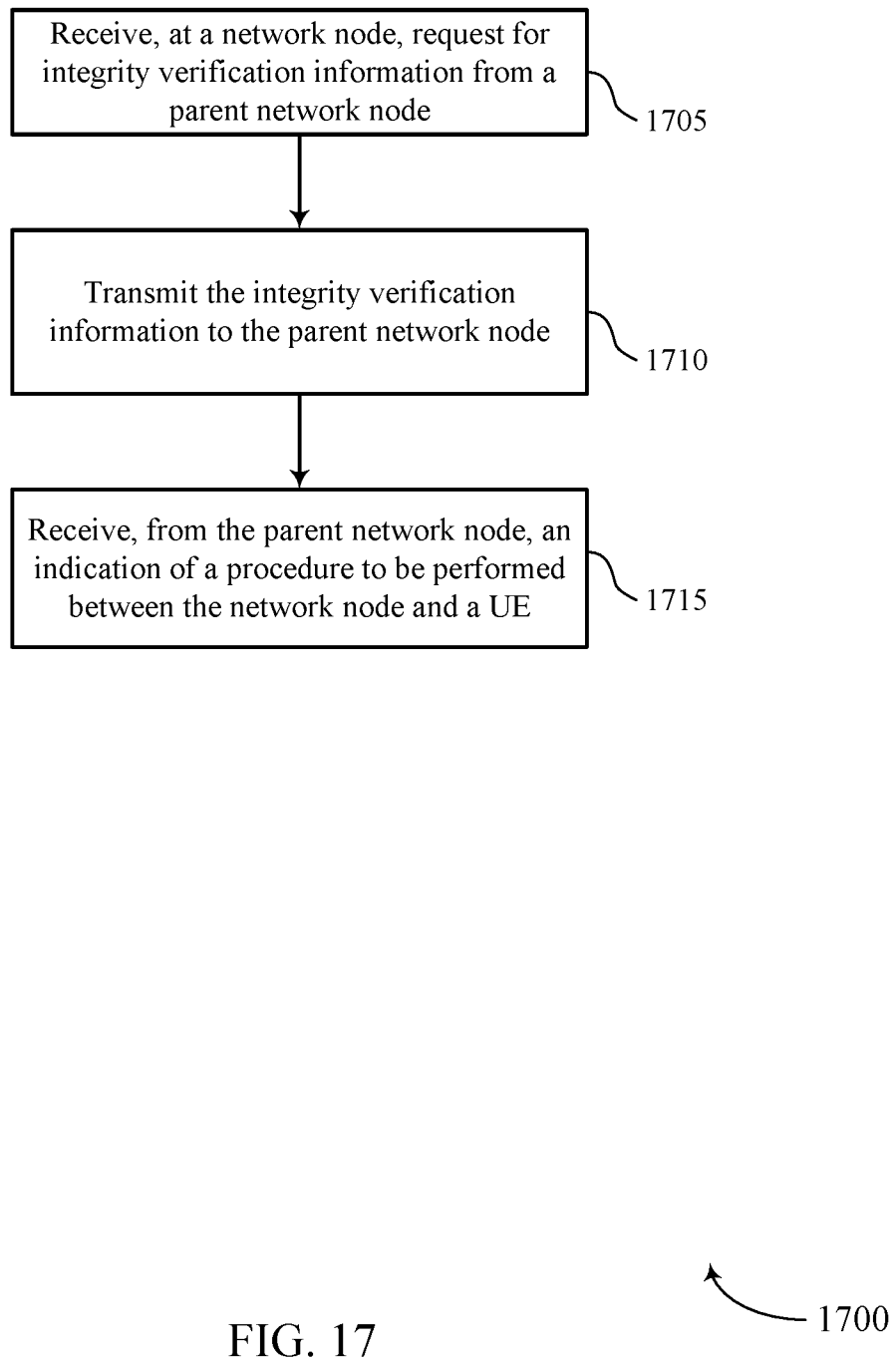

FIG. 17 shows a flowchart illustrating a method 1700 for on-demand network function re-authentication based on key refresh in accordance with various aspects of the present disclosure. The operations of method 1700 may be implemented by a network node or its components as described herein. For example, the operations of method 1700 may be performed by network node 210 as described with reference to FIG. 2. In some examples, the network node may perform aspects the functions described below using special-purpose hardware.

At block 1705, the network node may receive a request for integrity verification information from a parent network node. The operations of block 1705 may be performed according to the methods described with reference to FIGS. 1 through 4.

In some examples, the request for integrity verification information may be received as part of an integrity verification procedure between the parent network node and the network node.

At block 1710, the network node may transmit the integrity verification information to the parent network node. The operations of block 1710 may be performed according to the methods described with reference to FIGS. 1 through 4.

At block 1715, the network node may receive, from the parent network node, an indication of a procedure to be performed between the network node and a UE. The operations of block 1715 may be performed according to the methods described with reference to FIGS. 1 through 4.

It should be noted that the methods described above describe possible implementations, and that the operations may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunication system (UMTS). 3GPP LTE and LTE-A are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may for example be used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell for example covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may additionally or alternatively be called forward link transmissions while the uplink transmissions may additionally or alternatively be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
   establishing, by a user equipment (UE), a connection with a network node at a first time:
   determining, by the UE, an age of a security context associated with the connection with the network node, the age of the security context being based at least in part on the first time, and indicating that the security context has been established for more than a threshold time period;
   identifying, based at least in part on a key hierarchy, at least one parent network node associated with the network node;
   transmitting a key refresh request message from the UE to the identified parent network node to trigger a key refresh procedure between the identified parent network node and the network node; and performing a procedure with the network node to establish a new security context based at least in part on the key refresh procedure.

2. The method of claim 1, wherein the parent network node comprises a control plane core network (CP-CN) function and the network node comprises an access node (AN).

3. The method of claim 2, wherein the key refresh request message comprises a network access stratum (NAS) message.

4. The method of claim 1, wherein the parent network node comprises a security anchor function and the network node comprises a control plane core network (CP-CN) function.

5. The method of claim 4, wherein the security anchor function comprises a control plane authentication (CP-AU) function.

6. The method of claim 4, wherein the key refresh request message comprises an attach request message.

7. The method of claim 4, wherein the attach request message comprises an identifier associated with the UE.

8. The method of claim 4, wherein the key refresh request message comprises an authentication request message.

9. The method of claim 4, wherein the key refresh request message comprises an extensible authentication protocol (EAP) re-authentication message.

10. The method of claim 1, further comprising:
using, for a predetermined time period after the key refresh procedure, the security context for user plane packet protection.

11. The method of claim 1, further comprising:
performing at least one of encrypting the key refresh request message, integrity-protecting the key refresh request message, or combinations thereof.

12. An apparatus for wireless communication, in a system comprising:
a processor;
memory in electronic communication with the processor; and
instructions stored in the memory and operable, when executed by the processor, to cause the apparatus to:
establish a connection with a network node at a first time;
determine an age of a security context associated with the connection with the network node, the age of the security context being based at least in part on the first time, and indicating that the security context has been established for more than a threshold time period;
identify, based at least in part on a key hierarchy, at least one parent network node associated with the network node;
transmit a key refresh request message to the identified parent network node to trigger a key refresh procedure between the identified parent network node and the network node; and
perform a procedure with the network node to establish a new security context based at least in part on the key refresh procedure.

13. The apparatus of claim 12, wherein the parent network node comprises a control plane core network (CP-CN) function and the network node comprises an access node (AN).

14. The apparatus of claim 13, wherein the key refresh request message comprises a network access stratum (NAS) message.

15. The apparatus of claim 12, wherein the parent network node comprises a security anchor function and the network node comprises a control plane core network (CP-CN) function.

16. The apparatus of claim 15, wherein the security anchor function comprises a control plane authentication (CP-AU) function.

17. The apparatus of claim 15, wherein the key refresh request message comprises an attach request message.

18. The apparatus of claim 15, wherein the attach request message comprises an identifier associated with the UE.

19. The apparatus of claim 15, wherein the key refresh request message comprises an authentication request message.

20. The apparatus of claim 15, wherein the key refresh request message comprises an extensible authentication protocol (EAP) re-authentication message.

21. The apparatus of claim 12, wherein the processor further causes the apparatus to:
use, for a predetermined time period after the key refresh procedure, the security context for user plane packet protection.

22. The apparatus of claim 12, wherein the processor further causes the apparatus to:
perform at least one of encrypting the key refresh request message, integrity-protecting the key refresh request message, or combinations thereof.

23. An apparatus for wireless communication, comprising:
means for establishing, by a user equipment (UE), a connection with a network node at a first time;
means for determining, by the UE, an age of a security context associated with the connection with the network node, the age of the security context being based at least in part on the first time, and indicating that the security context has been established for more than a threshold time period;
means for identifying, based at least in part on a key hierarchy, at least one parent network node associated with the network node;
means for transmitting a key refresh request message from the UE to the identified parent network node to trigger a key refresh procedure between the identified parent network node and the network node; and
means for performing a procedure with the network node to establish a new security context based at least in part on the key refresh procedure.

24. The apparatus of claim 23, wherein the parent network node comprises a control plane core network (CP-CN) function and the network node comprises an access node (AN).

25. The apparatus of claim 24, wherein the key refresh request message comprises a network access stratum (NAS) message.

26. The apparatus of claim 23, wherein the parent network node comprises a security anchor function and the network node comprises a control plane core network (CP-CN) function.

27. The apparatus of claim 26, wherein the security anchor function comprises a control plane authentication (CP-AU) function.

28. The apparatus of claim 26, wherein the key refresh request message comprises an attach request message.

29. The apparatus of claim 26, wherein the attach request message comprises an identifier associated with the UE.

30. A non-transitory computer readable medium storing code for wireless communication, the code comprising instructions executable by a processor to:
- establish, by a user equipment (UE), a connection with a network node at a first time;
- determine, by the UE, an age of a security context associated with the connection with the network node, the age of the security context being based at least in part on the first time, and indicating that the security context has been established for more than a threshold time period;
- identify, based at least in part on a key hierarchy, at least one parent network node associated with the network node;
- transmit a key refresh request message from the UE to the identified parent network node to trigger a key refresh procedure between the identified parent network node and the network node; and
- perform a procedure with the network node to establish a new security context based at least in part on the key refresh procedure.

\* \* \* \* \*